(12) United States Patent
Chang

(10) Patent No.: US 11,523,252 B2
(45) Date of Patent: Dec. 6, 2022

(54) POSITIONING METHOD, TERMINAL, AND SERVER

(71) Applicant: Huawei Cloud Computing Technologies Co., Ltd., Guizhou (CN)

(72) Inventor: Hongna Chang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/988,858

(22) Filed: Aug. 10, 2020

(65) Prior Publication Data
US 2020/0374658 A1  Nov. 26, 2020

Related U.S. Application Data

(63) Continuation of application No. PCT/CN2019/073340, filed on Jan. 28, 2019.

(30) Foreign Application Priority Data

Feb. 11, 2018  (CN) .......................... 201810142197.0

(51) Int. Cl.
  *H04W 60/00* (2009.01)
  *H04W 4/02* (2018.01)
  *G01S 11/02* (2010.01)
(52) U.S. Cl.
  CPC ............. *H04W 4/025* (2013.01); *G01S 11/02* (2013.01); *H04W 60/00* (2013.01)
(58) Field of Classification Search
  CPC ....... H04W 4/02; H04W 4/023; H04W 4/025; H04W 4/029; H04W 60/00;
  (Continued)

(56) References Cited

U.S. PATENT DOCUMENTS 8,483,707 B2 * 7/2013 Krishnamurthy ..... G01S 5/0036
                                                  370/320
2006/0179149 A1 * 8/2006 Janning ................. H04L 65/401
                                                  709/227
(Continued)

FOREIGN PATENT DOCUMENTS

CN   103906228 A   7/2014
CN   105445769 A   3/2016
(Continued)

OTHER PUBLICATIONS

Open Mobile Alliance, "Secure User Plane Location Architecture Candidate Version 2.0," Jun. 27, 2008, OMA-AD-SUPL-V2_0-20080627-C, 54 pages.
(Continued)

*Primary Examiner* — Jean A Gelin
(74) *Attorney, Agent, or Firm* — Conley Rose, P.C.

(57) ABSTRACT

A positioning method includes separately sending, by a terminal, a request for obtaining assistance data to a serving base station and a neighboring cell base station; separately receiving, by the terminal, assistance data from the serving base station and the neighboring cell base station; identifying, by the terminal based on the assistance data, reference signals received from the serving base station and the neighboring cell base station; calculating, by the terminal, a time difference of arrival based on times at which the reference signals arrive at the terminal; and sending, by the terminal, the time difference to a server using an application layer protocol, to enable the server to calculate location information of the terminal.

24 Claims, 10 Drawing Sheets

(58) Field of Classification Search
CPC .. H04W 64/006; G01S 5/0036; G01S 5/0236; G01S 5/02526; G01S 5/10; G01S 11/02; H04L 29/08
See application file for complete search history.

(56) References Cited

U.S. PATENT DOCUMENTS

| | | | | |
|---|---|---|---|---|
| 2010/0265093 | A1* | 10/2010 | Cho | H04W 24/00 340/8.1 |
| 2010/0331009 | A1* | 12/2010 | Krishnamurthy | G01S 5/0236 455/456.1 |
| 2014/0176366 | A1* | 6/2014 | Fischer | G01S 5/10 342/374 |
| 2015/0133173 | A1* | 5/2015 | Edge | G01S 5/08 455/456.6 |
| 2016/0360370 | A1* | 12/2016 | Edge | G01S 5/0268 |
| 2018/0077670 | A1* | 3/2018 | Jain | H04W 64/00 |
| 2018/0146332 | A1* | 5/2018 | Opshaug | G01S 5/10 |
| 2018/0217224 | A1* | 8/2018 | Jain | G01S 5/0221 |
| 2018/0227877 | A1* | 8/2018 | Gunnarsson | G01S 1/045 |
| 2018/0270784 | A1 | 9/2018 | Lee et al. | |
| 2018/0284148 | A1* | 10/2018 | Remboski | G01L 19/086 |
| 2018/0332430 | A1* | 11/2018 | Kumar | H04W 4/02 |
| 2019/0132816 | A1 | 5/2019 | Xue et al. | |
| 2020/0045667 | A1* | 2/2020 | Modarres Razavi | H04W 64/003 |
| 2020/0229131 | A1* | 7/2020 | Li | G01S 19/04 |

FOREIGN PATENT DOCUMENTS

| | | |
|---|---|---|
| CN | 105792115 A | 7/2016 |
| CN | 106912101 A | 6/2017 |
| CN | 107426685 A | 12/2017 |
| JP | 5597231 B2 | 10/2014 |
| WO | 2017034182 A1 | 3/2017 |
| WO | 2017219283 A1 | 12/2017 |

OTHER PUBLICATIONS

3GPP TS 36.355 V14.4.0, Dec. 2017, "3rd Generation Partnership Project; Technical Specification Group Radio Access Network; Evolved Universal Terrestrial Radio Access (E-UTRA); LTE Positioning Protocol (LPP) (Release 14)," 168 pages.

* cited by examiner

POSITIONING METHOD, TERMINAL, AND SERVER

CROSS-REFERENCE TO RELATED APPLICATIONS

This application is a continuation of International Patent Application No. PCT/CN2019/073340 filed on Jan. 28, 2019, which claims priority to Chinese Patent Application No. 201810142197.0 filed on Feb. 11, 2018. The disclosures of the aforementioned applications are hereby incorporated by reference in their entireties.

TECHNICAL FIELD

This application relates to the communications field, and in particular, to a positioning method, a terminal, and a server.

BACKGROUND

In some application scenarios, a terminal needs to report location information. For example, the terminal needs to report location information in scenarios such as logistics tracking, asset tracking, and well cover positioning tracking management. However, a terminal is usually sensitive to energy consumption such as battery power supply. Factors such as power consumption, a processing capability, and positioning precision of a positioning technology need to be considered during selection of the positioning technology.

Existing positioning technologies may be roughly classified into three types: mobile terminal-based positioning, indoor positioning, and network-based positioning. The network-based positioning is base station positioning. Currently, in a 3rd Generation Partnership Project (3GPP) standard, terminal positioning supports enhanced cell identifier (ECID) positioning method and a reference signal time difference (RSTD) of arrival (observed time difference of arrival (OTDOA)) positioning method. The ECID positioning method has an advantage of lower power consumption, but the ECID positioning method has low positioning precision. Consequently, an application scenario of the ECID positioning method is limited. Compared with the ECID positioning method, the OTDOA positioning method has higher precision, but the OTDOA positioning method has higher dependence on a network.

SUMMARY

Embodiments of this application provide a positioning method, a terminal, and a server, to reduce network dependence and terminal complexity in a process of calculating location information of the terminal.

In view of this, one aspect of the embodiments of this application provides a positioning method. The method may include first, sending, by a terminal, a request for obtaining assistance data to a serving base station and a neighboring cell base station separately, then, separately receiving, by the terminal, assistance data sent by the serving base station and the neighboring cell base station, identifying, by the terminal based on the assistance data, reference signal separately sent by the serving base station and the neighboring cell base station, calculating, by the terminal, a time difference of arrival based on time at which the reference signal separately sent by the serving base station and the neighboring cell base station arrive at the terminal, and sending, by the terminal, the time difference of arrival to a server using an application layer protocol, where the time difference of arrival is used by the server to calculate location information of the terminal.

In the embodiments of this application, in a process in which the server locates the terminal, the terminal actively obtains the assistance data from the base station such that an enhanced serving mobile location center (E-SMLC) network element does not need to be deployed, the terminal does not need to support a Long-Term Evolution (LTE) Positioning Protocol (LPP), and the base station does not need to support an LPP Annex (LPPa) protocol. This reduces network dependence, and reduces terminal complexity.

Optionally, in some embodiments of this application, the time difference of arrival is a difference between time at which the terminal receives the reference signals. It can be understood that both the base station corresponding to the terminal and the neighboring cell base station send the reference signals to the terminal. In this case, the terminal has the time for receiving the reference signals, and the time difference of arrival is the difference between the time at which the terminal receives the reference signals. The embodiments of this application further describe the concept of the time difference of arrival such that the technical method in this application is clearer.

Optionally, in some embodiments of this application, before sending, by a terminal, a request for obtaining assistance data to a serving base station and a neighboring cell base station separately, the method may further include receiving, by the terminal using the application layer protocol, information about the neighboring cell base station sent by the server. In the embodiments of this application, how the terminal obtains the information about the neighboring cell base station is described as follows. The information about the neighboring cell base station is determined by the server, and then is sent to the terminal using the application layer protocol.

Optionally, in some embodiments of this application, before receiving, by the terminal using the application layer protocol, information about the neighboring cell base station sent by the server, the method may further include sending, by the terminal, a registration request to the server using the application layer protocol, where the registration request includes information indicating at least one positioning method supported by the terminal, and it can be understood that the information about the at least one positioning method supported by the terminal may include information about an OTDOA positioning method, information about an ECID positioning method, information about a Global Positioning System (GPS) positioning method, and the like, and receiving, by the terminal using the application layer protocol, information that is sent by the server and that indicates a target positioning method, where the target positioning method is a positioning method selected by the server from the at least one positioning method supported by the terminal, and sending, by the terminal, cell information to the server according to the target positioning method.

In the embodiments of this application, an objective of sending the cell information by the terminal to the server is to enable the server to determine the information about the neighboring cell base station. The cell information is information about a cell in which the terminal is located, and may be a physical cell identifier or may be a location cell identifier. This is not limited. This helps the terminal actively obtain the assistance data from the serving base station and the neighboring cell base station separately, thereby improving feasibility and integrity of the solution.

Optionally, in some embodiments of this application, when sending the cell information to the server, the terminal may further report a positioning capability of the terminal to the server. The positioning capability is a positioning capability of the terminal in the target positioning method. The server may determine, based on the positioning capability, a quantity of neighboring cell base stations whose information is to be delivered to the terminal.

Optionally, in some embodiments of this application, the method may further include sending, by the terminal to the server using the application layer protocol, information indicating strength of the reference signal, where the reference signal strength is used by the server to establish a fingerprint database, and the fingerprint database includes a mapping relationship between the strength of the reference signal and location information of the terminal, and the fingerprint database may be used for subsequently positioning a terminal. It can be understood that, the fingerprint database is constructed for some relatively simple terminals that may have only an ECID positioning capability. Precision of the positioning method depends on the fingerprint database. When there are many fingerprint nodes in the fingerprint database, positioning precision of the positioning method is high, otherwise, positioning precision is low. Therefore, if the fingerprint database is constructed, and a node quantity in the fingerprint database is increased, positioning precision of a subsequent node can be improved.

Optionally, in some embodiments of this application, there are at least two neighboring cell base stations. It can be understood that, if the OTDOA positioning method is used in the embodiments of this application, at least three base stations need to participate in the positioning method, one may be the base station corresponding to the terminal, and the other two may be neighboring cell base stations of the base station corresponding to the terminal.

Another aspect of the embodiments of this application provides a positioning method, and the method may include first, receiving, by a terminal using an application layer protocol, assistance data sent by a server, where it should be understood that the assistance data is obtained by the server herein, and is sent to the terminal, and identifying, by the terminal based on the assistance data, reference signal separately sent by a serving base station and a neighboring cell base station, calculating, by the terminal, a time difference of arrival based on time at which the reference signal separately sent by the serving base station and the neighboring cell base station arrive at the terminal, and sending, by the terminal, the time difference of arrival to the server using the application layer protocol, where the time difference of arrival is used by the server to calculate location information of the terminal.

In the embodiments of this application, in a process in which the server locates the terminal, the server actively obtains the assistance data, and sends the assistance data to the terminal such that an E-SMLC network element does not need to be deployed, the terminal does not need to support an LPP protocol, and the base station does not need to support an LPPa protocol. This reduces network dependence, and reduces terminal complexity.

Optionally, in some embodiments of this application, the time difference of arrival is a difference between time at which the terminal receives the reference signals. It can be understood that both the base station corresponding to the terminal and the neighboring cell base station send the reference signals to the terminal. In this case, the terminal may learn of the time for receiving the reference signals, and the time difference of arrival is the difference between the time at which the terminal receives the reference signals. The embodiments of this application further describe the concept of the time difference of arrival such that the technical method in this application is clearer.

Optionally, in some embodiments of this application, before receiving, by a terminal using an application layer protocol, assistance data sent by a server, the method may further include sending, by the terminal, a registration request to the server using the application layer protocol, where the registration request includes information indicating at least one positioning method supported by the terminal, and it can be understood that the information about the at least one positioning method supported by the terminal may include information about an OTDOA positioning method, information about an ECID positioning method, information about a GPS positioning method, and the like, and receiving, by the terminal using the application layer protocol, information that is sent by the server and that indicates a target positioning method, where the target positioning method is a positioning method selected by the server from the at least one positioning method supported by the terminal, and sending, by the terminal, cell information to the server according to the target positioning method.

In the embodiments of this application, an objective of sending the cell information by the terminal to the server is to enable the server to determine information about the neighboring cell base station. The cell information is information about a cell in which the terminal is located, and may be a physical cell identifier or may be a location cell identifier. This is not limited. This helps the server actively obtain the assistance data from the serving base station corresponding to the terminal and the neighboring cell base station separately, thereby improving feasibility and integrity of the solution.

Optionally, in some embodiments of this application, when sending the cell information to the server, the terminal may further report a positioning capability of the terminal to the server. The positioning capability is a positioning capability of the terminal in the target positioning method. The server may determine, based on the positioning capability, a quantity of neighboring cell base stations whose information is to be delivered to the terminal.

Optionally, in some embodiments of this application, the method may further include sending, by the terminal to the server using the application layer protocol, information indicating strength of the reference signal, where the reference signal strength is used by the server to establish a fingerprint database, and the fingerprint database includes a mapping relationship between the strength of the reference signal and location information of the terminal, and the fingerprint database may be used for subsequently positioning a terminal. It can be understood that, the fingerprint database is constructed for some relatively simple terminals that may have only an ECID positioning capability. Precision of the positioning method depends on the fingerprint database. When there are many fingerprint nodes in the fingerprint database, positioning precision of the positioning method is high, otherwise, positioning precision is low. Therefore, if the fingerprint database is constructed, and a node quantity in the fingerprint database is increased, positioning precision of a subsequent node can be improved.

Optionally, in some embodiments of this application, there are at least two neighboring cell base stations. It can be understood that, if the OTDOA positioning method is used in the embodiments of this application, at least three base stations need to participate in the positioning method, one may be the base station corresponding to the terminal, and the other two may be a quantity of neighboring cell base stations of the base station corresponding to the terminal.

Still another aspect of the embodiments of this application provides a positioning method, and the method may include sending, by a server, information about a first neighboring cell base station to a terminal using an application layer protocol, where the first neighboring cell base station is a neighboring base station of a first serving base station corresponding to the terminal, receiving, by the server using the application layer protocol, a first time difference of arrival sent by the terminal, where the first time difference of arrival is a time difference of arrival that is calculated by the terminal based on time at which first reference signal separately sent by the first serving base station and the first neighboring cell base station arrive at the terminal, and calculating, by the server, first location information of the terminal based on the first time difference of arrival and a preconfigured location calculation algorithm.

In the embodiments of this application, in a process in which the server locates the terminal, the terminal actively obtains assistance data from the base station such that an E-SMLC network element does not need to be deployed, the terminal does not need to support an LPP protocol, and the base station does not need to support an LPPa protocol. This reduces network dependence, and reduces terminal complexity.

Optionally, in some embodiments of this application, the first time difference of arrival is a difference between time at which the terminal receives the first reference signals. It can be understood that both the first serving base station corresponding to the terminal and the first neighboring cell base station send the first reference signals to the terminal. In this case, the terminal has the time for receiving the first reference signals, and the first time difference of arrival is the difference between the time at which the terminal receives the first reference signals. The embodiments of this application further describe the concept of the first time difference of arrival such that the technical method in this application is clearer.

Optionally, in some embodiments of this application, before the sending, by a server, information about a first neighboring cell base station to a terminal using an application layer protocol, the method may further include receiving, by the server using the application layer protocol, a registration request sent by the terminal, where the registration request includes information indicating at least one positioning method supported by the terminal, and it can be understood that the information about the at least one positioning method supported by the terminal may include information about an OTDOA positioning method, information about an ECID positioning method, information about a GPS positioning method, and the like, and sending, by the server to the terminal using the application layer protocol, information indicating a target positioning method, where the target positioning method is a positioning method selected by the server from the at least one positioning method supported by the terminal, and receiving, by the server using the application layer protocol, cell information sent by the terminal.

In the embodiments of this application, the server may determine information about the neighboring cell base station based on the cell information. The cell information is information about a cell in which the terminal is located, and may be a physical cell identifier or may be a location cell identifier. This is not limited. This helps the terminal actively obtain the assistance data from the serving base station and the neighboring cell base station separately, thereby improving feasibility and integrity of the solution.

Optionally, in some embodiments of this application, when sending the cell information to the server, the terminal may further report a positioning capability of the terminal to the server. The positioning capability is a positioning capability of the terminal in the target positioning method. The server may determine, based on the positioning capability, a quantity of neighboring cell base stations whose information is to be delivered to the terminal.

Optionally, in some embodiments of this application, the server determines the first neighboring cell base station based on the cell information and a preconfigured mapping relationship between a cell and a base station. In the embodiments of this application, an implementation on how to determine the first neighboring cell base station is described such that the technical solution in this application is more complete.

Optionally, in some embodiments of this application, the method may further include sending, by the server, information about a second neighboring cell base station to a reference terminal using the application layer protocol, where the second neighboring cell base station is a neighboring base station of a second serving base station corresponding to the reference terminal, and the second serving base station corresponding to the reference terminal is the same as the first serving base station corresponding to the terminal, receiving, by the server using the application layer protocol, a second time difference of arrival sent by the reference terminal, where the second time difference of arrival is a time difference of arrival that is calculated by the reference terminal based on time at which second reference signal separately sent by the second serving base station and the second neighboring cell base station arrive at the terminal, calculating, by the server, second location information of the reference terminal based on the second time difference of arrival and the preconfigured location calculation algorithm, and determining, by the server, error location information based on reference location information of the reference terminal stored in a fingerprint database and the second location information of the reference terminal.

In the embodiments of this application, the server may select one or more terminals from the fingerprint database as the reference terminal. The server stores the reference location information of the reference terminal. Then, the server may calculate the second location information of the reference terminal, and then determine the error location information based on the reference location information of the reference terminal and the second location information of the reference terminal. The error location information may be used to further determine reference location information of the terminal.

Optionally, in some embodiments of this application, the method may further include calculating, by the server, first reference location information of the terminal based on the error location information and the first location information. Then, the reference location information of the terminal is determined based on the error local information and the first location information of the terminal. The obtained reference location information of the terminal is more accurate and reliable.

Optionally, in some embodiments of this application, the method may further include receiving, by the server using the application layer protocol, information that is sent by the terminal and that indicates strength of the first reference signal, and establishing, by the server, the fingerprint database based on the first reference signal strength and the first location information of the terminal. The fingerprint database may be used for subsequently positioning a terminal. It can be understood that, the fingerprint database is constructed for some relatively simple terminals that may have only an ECID positioning capability. Precision of the positioning method depends on the fingerprint database. When there are many fingerprint nodes in the fingerprint database, positioning precision of the positioning method is high, otherwise, positioning precision is low. Therefore, if the fingerprint database is constructed, and a node quantity in the fingerprint database is increased, positioning precision of a subsequent node can be improved.

Still another aspect of the embodiments of this application provides a positioning method, and the method may include obtaining, by a server, first assistance data, sending, by the server, the first assistance data to a terminal using an application layer protocol, receiving, by the server using the application layer protocol, a first time difference of arrival sent by the terminal, where the first time difference of arrival is a time difference of arrival that is calculated by the terminal based on time at which first reference signal separately sent by a first serving base station and a first neighboring cell base station arrive at the terminal, and the first neighboring cell base station is a neighboring base station of the first serving base station corresponding to the terminal, and calculating, by the server, first location information of the terminal based on the first time difference of arrival and a preconfigured location calculation algorithm.

In the embodiments of this application, in a process in which the server locates the terminal, the server actively obtains the assistance data, and sends the assistance data to the terminal such that an E-SMLC network element does not need to be deployed, the terminal does not need to support an LPP protocol, and the base station does not need to support an LPPa protocol. This reduces network dependence, and reduces terminal complexity.

Optionally, in some embodiments of this application, the first time difference of arrival is a difference between time at which the terminal receives the first reference signals. It can be understood that both the first serving base station corresponding to the terminal and the first neighboring cell base station send the first reference signals to the terminal. In this case, the terminal has the time for receiving the first reference signals, and the first time difference of arrival is the difference between time at which the terminal receives the first reference signals. The embodiments of this application further describe the concept of the first time difference of arrival such that the technical method in this application is clearer.

Optionally, in some embodiments of this application, obtaining, by a server, first assistance data may include sending, by the server, a first assistance data request to a service capability exposure network element, where the first assistance data request includes identifiers of the first serving base station and the first neighboring cell base station, and receiving, by the server, the first assistance data sent by the service capability exposure network element. It can be understood that, the first assistance data is obtained by the server by initiating the first assistance data request to the service capability exposure network element. The first assistance data request may be sent, using the service capability exposure network element and a mobility management entity (MME), to the first serving base station corresponding to the terminal and the first neighboring cell base station. The first serving base station corresponding to the terminal and the first neighboring cell base station return the first assistance data based on the first assistance data request. The embodiments of this application provide an implementation of obtaining the first assistance data by the server.

Optionally, in some embodiments of this application, before obtaining, by a server, first assistance data, the method may further include receiving, by the server using the application layer protocol, a registration request sent by the terminal, where the registration request includes information indicating at least one positioning method supported by the terminal, and it can be understood that the information about the at least one positioning method supported by the terminal may include information about an OTDOA positioning method, information about an ECID positioning method, information about a GPS positioning method, and the like, and sending, by the server to the terminal using the application layer protocol, information indicating a target positioning method, where the target positioning method is a positioning method selected by the server from the at least one positioning method supported by the terminal, and receiving, by the server using the application layer protocol, cell information sent by the terminal.

In the embodiments of this application, the server may determine information about the neighboring cell base station based on the cell information. The cell information is information about a cell in which the terminal is located, and may be a physical cell identifier or may be a location cell identifier. This is not limited. This helps the terminal actively obtain the assistance data from the serving base station and the neighboring cell base station separately, thereby improving feasibility and integrity of the solution.

Optionally, in some embodiments of this application, when sending the cell information to the server, the terminal may further report a positioning capability of the terminal to the server. The positioning capability is a positioning capability of the terminal in the target positioning method. The server may determine, based on the positioning capability, a quantity of neighboring cell base stations whose information is to be delivered to the terminal.

Optionally, in some embodiments of this application, the method may further include determining, by the server, the first neighboring cell base station based on the cell information and a preconfigured mapping relationship between a cell and a base station. In the embodiments of this application, an implementation on how to determine the first neighboring cell base station is described such that the technical solution in this application is more complete.

Optionally, in some embodiments of this application, the method may further include obtaining, by the server, second assistance data, sending, by the server, the second assistance data to a reference terminal using the application layer protocol, where a second serving base station corresponding to the reference terminal is the same as the first serving base station corresponding to the terminal, receiving, by the server using the application layer protocol, a second time difference of arrival sent by the reference terminal, where the second time difference of arrival is a time difference of arrival that is calculated by the reference terminal based on time at which second reference signal separately sent by the second serving base station and a second neighboring cell base station arrive at the terminal, and the second neighboring cell base station is a neighboring base station of the second serving base station corresponding to the reference terminal, calculating, by the server, second location information of the reference terminal based on the second time difference of arrival and the preconfigured location calculation algorithm, and determining, by the server, error location information based on reference location information of the reference terminal stored in a fingerprint database and the second location information of the reference terminal.

In the embodiments of this application, the server may select one or more terminals from the fingerprint database as the reference terminal. The server stores the reference location information of the reference terminal. Then, the server may calculate the second location information of the reference terminal, and then determine the error location information based on the reference location information of the reference terminal and the second location information of the reference terminal. The error location information may be used to further determine reference location information of the terminal.

Optionally, in some embodiments of this application, obtaining, by the server, second assistance data may include sending, by the server, a second assistance data request to the service capability exposure network element, where the second assistance data request includes identifiers of the second serving base station and the second neighboring cell base station, and receiving, by the server, the second assistance data sent by the service capability exposure network element. It can be understood that, the second assistance data is obtained by the server by initiating the second assistance data request to the service capability exposure network element. The second assistance data request may be sent, using the service capability exposure network element and the MME, to the second serving base station corresponding to the reference terminal and the second neighboring cell base station. The second serving base station corresponding to the reference terminal and the second neighboring cell base station return the second assistance data based on the second assistance data request. The embodiments of this application provide an implementation of obtaining the second assistance data by the server.

Optionally, in some embodiments of this application, the method may further include calculating, by the server, first reference location information of the terminal based on the error location information and the first location information. Then, the reference location information of the terminal is determined based on the error local information and the first location information of the terminal. The obtained reference location information of the terminal is more accurate and reliable.

Optionally, in some embodiments of this application, the method may further include receiving, by the server using the application layer protocol, information that is sent by the terminal and that indicates strength of the first reference signal, and establishing, by the server, the fingerprint database based on the first reference signal strength and the first location information of the terminal. The fingerprint database may be used for subsequently positioning a terminal. It can be understood that, the fingerprint database is constructed for some relatively simple terminals that may have only an ECID positioning capability. Precision of the positioning method depends on the fingerprint database. When there are many fingerprint nodes in the fingerprint database, positioning precision of the positioning method is high, otherwise, positioning precision is low. Therefore, if the fingerprint database is constructed, and a node quantity in the fingerprint database is increased, positioning precision of a subsequent node can be improved.

Still another aspect of the embodiments of this application provides a terminal that has a function of reducing network dependence and reducing terminal complexity in a process of calculating location information of the terminal. The function may be implemented by hardware, or may be implemented by the hardware by executing corresponding software. The hardware or the software includes one or more modules corresponding to the function.

Still another aspect of the embodiments of this application provides a server that has a function of reducing network dependence and reducing terminal complexity in a process of calculating location information of a terminal. The function may be implemented by hardware, or may be implemented by the hardware by executing corresponding software. The hardware or the software includes one or more modules corresponding to the function.

Still another aspect of the embodiments of this application provides a terminal, and the terminal may include a transceiver configured to communicate with an apparatus other than the terminal, a memory configured to store a computer executable instruction, and one or more processors, connected to the memory and the transceiver using a bus. The processor executes the computer executable instruction and one or more computer programs stored in the memory. The one or more computer programs include an instruction, and when the instruction is executed by the terminal, the terminal is enabled to perform the method in the foregoing aspects or any optional implementation of the aspects.

Still another aspect of the embodiments of this application provides a server, and the server may include a transceiver configured to communicate with an apparatus other than the server, a memory configured to store a computer executable instruction, and one or more processors, connected to the memory and the transceiver using a bus. The processor executes the computer executable instruction and one or more computer programs stored in the memory. The one or more computer programs include an instruction, and when the instruction is executed by the server, the server is enabled to perform the method in the foregoing aspects or any optional implementation of the aspects.

Still another aspect of the embodiments of this application provides a wireless communications apparatus, and the wireless communications apparatus may include at least one processor, a memory, a transceiver circuit, and a bus system.

The processor, the memory, and the transceiver circuit are coupled using the bus system. The wireless communications apparatus communicates with a server using the transceiver circuit. The memory is configured to store a program instruction. The at least one processor is configured to execute the program instruction stored in the memory. The wireless communications apparatus is enabled to perform the part performed by the terminal in the method in the foregoing aspects of the embodiments of this application. The wireless communications apparatus may be a terminal, or may be a chip that is applied to a terminal and that performs a corresponding function.

Still another aspect of the embodiments of this application provides a wireless communications apparatus, and the wireless communications apparatus may include at least one processor, a memory, a transceiver circuit, and a bus system.

The processor, the memory, and the transceiver circuit are coupled using the bus system. The wireless communications apparatus communicates with a server using the transceiver circuit. The memory is configured to store a program instruction. The at least one processor is configured to execute the program instruction stored in the memory. The wireless communications apparatus is enabled to perform the part performed by the server in the method in the foregoing aspects of the embodiments of this application. The wireless communications apparatus may be a server, or may be a system chip that is applied to a server and that performs a corresponding function.

Still another aspect of the embodiments of this application provides a storage medium. It should be noted that the technical solutions of this application essentially, or the part contributing to the other approaches, or all or some of the technical solutions may be implemented in a form of a software product. The computer software product is stored in the storage medium, the storage medium is configured to store a computer software instruction used by the foregoing terminal. The computer software instruction includes a program executed by and designed for the terminal in the foregoing aspects. Alternatively, the storage medium is configured to store a computer software instruction used by the foregoing server. The computer software instruction includes a program executed by and designed for the server in the foregoing aspects.

The storage medium includes various media that can store program code, such as a Universal Serial Bus (USB) flash drive, a removable hard disk, a read-only memory (ROM), a random-access memory (RAM), a magnetic disk, or an optical disc.

Still another aspect of the embodiments of this application provides a computer program product including an instruction, and when the computer program product is run on a computer, the computer is enabled to perform the method in the foregoing aspects or any optional implementation of the foregoing aspects.

BRIEF DESCRIPTION OF DRAWINGS

To describe the technical solutions in the embodiments of this application more clearly, the following briefly describes the accompanying drawings required for describing the other approaches or the embodiments. The accompanying drawings in the following description show merely some embodiments of this application, and other drawings may still be derived from these accompanying drawings.

DESCRIPTION OF EMBODIMENTS

Figure 1:
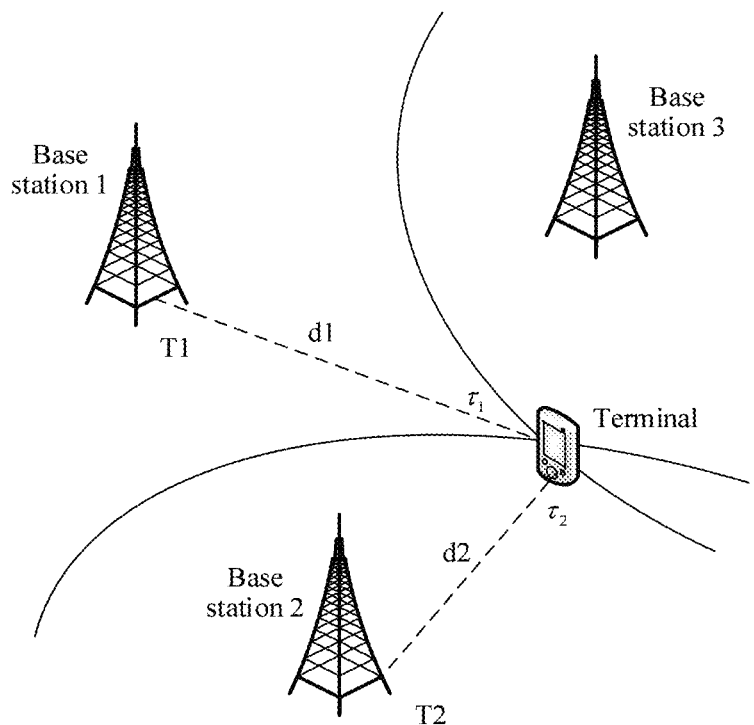
FIG. 1 is a schematic diagram of an OTDOA positioning method according to an embodiment of this application.

Embodiments of this application provide a positioning method, a terminal, and a server, to reduce network dependence and terminal complexity in a process of calculating location information of the terminal.

To enable a person skilled in the art to better understand the technical solutions in this application, the following describes the technical solutions in the embodiments of this application with reference to the accompanying drawings in the embodiments of this application. It is clearly that the described embodiments are merely a part rather than all of the embodiments of this application. All the embodiments in this application shall fall within the protection scope of this application.

Mobile terminal-based positioning usually refers to satellite positioning, for example, a GPS, a BEIDOU positioning system, and a global navigation satellite system (GLONASS). This type of positioning technology has high positioning precision, but power consumption of a positioning module of this type of positioning technology is high. This type of positioning technology is usually applied to a terminal that is insensitive to power consumption, for example, a high-configuration terminal such as an in-vehicle infotainment and a mobile phone. In addition, satellite positioning is easily affected by weather and obstruction, and a location offset easily occurs during indoor positioning or positioning in an area with many buildings.

An indoor positioning technology includes a positioning technology such as BLUETOOTH, WI-FI, or infrared, and has high precision. However, a positioning scenario of the indoor positioning technology is small-range indoor positioning, for example, positioning for a person in a factory.

An E-SMLC of a location calculation network element needs to be deployed for an OTDOA positioning method. The E-SMLC needs to support an LPP and an LPPa protocol. The LPPa protocol needs to be supported by an evolved NodeB (eNodeB). However, a terminal has high complexity and needs to support the LPP protocol. This limits application of the positioning technology.

A reference signal (RS) is a "pilot" signal, and is a known signal that is provided by a transmit end for a receive end to perform channel estimation or channel sounding. However, the transmit end herein is a target base station, and the receive end is a terminal. In an LTE network, a base station usually allocates a part of a system bandwidth to a specific terminal. To be specific, a specific frequency resource is allocated to the terminal at a specific time. In this case, if the base station learns which specific frequency area has relatively good quality, the specific frequency area is allocated to the terminal such that service quality of the terminal can be better guaranteed. In this case, the reference signal can provide a reference for the base station to perform resource scheduling.

The following briefly describes a principle of RSTD of arrival (OTDOA) positioning, which is shown as follows.

According to the OTDOA positioning method, a terminal location is determined by detecting a time difference of arrival of reference signals of at least three different base stations. FIG. 1 is a schematic diagram of an OTDOA positioning method according to an embodiment of this application. As shown in FIG. 1, a terminal is located on a hyperbolic curve in which two base stations are used as focal points. It is assumed that coordinates of the terminal are (x, y), location coordinates of a base station i are (xi, yi), a time at which the base station i sends a signal is Ti, and a time at which the terminal receives the signal is $\tau_i$. An equation may be obtained based on the base station i as shown in (1-1):

$$\tau_i - T_i = \frac{\sqrt{(x-x_i)^2 + (y-y_i)^2}}{c}. \tag{1-1}$$

Therefore, an equation may be obtained based on a time difference of arrival of reference signals from a base station 1 and a base station 2 to the terminal as shown in (1-2):

$$\tau_2 - \tau_1 = \tag{1-2}$$
$$T_2 - T_1 + \frac{\sqrt{(x-x_2)^2 + (y-y_2)^2} - \sqrt{(x-x_1)^2 + (y-y_1)^2}}{c}.$$

Because more than two hyperbolic equations need to be established to determine the terminal location, an intersection of two hyperbolic lines is two-dimensional location coordinates of the terminal, and if the base station 1 is used as a reference cell, an equation set shown in (1-3) may be obtained:

$$\tau_2 - \tau_1 = \tag{1-3}$$
$$(T_2 - T_1) + \frac{\sqrt{(x-x_2)^2 + (y-y_2)^2} - \sqrt{(x-x_1)^2 + (y-y_1)^2}}{c}$$
$$\tau_3 - \tau_1 =$$
$$(T_3 - T_1) + \frac{\sqrt{(x-x_3)^2 + (y-y_3)^2} - \sqrt{(x-x_1)^2 + (y-y_1)^2}}{c}.$$

Two-dimensional geographical coordinates of the terminal can be obtained by solving the equation set (1-3). In the foregoing formulas (1-1), (1-2), and (1-3), c represents a speed of light. An E-SMLC may obtain a sending time difference (Ti−T1) of the base stations and location coordinate information of each base station using an LPPa protocol. To obtain accurate location, according to the OTDOA method, more than three base stations are required to participate in measurement of a location parameter such as a RSTD. Considering that an effect may not be good when the terminal performs downlink detection on a signal of a neighboring base station using a common reference signal, a Positioning Reference Signal (PRS) is introduced in an LTE system, and is used by the terminal to measure a signal of the base station in the OTDOA positioning method.

It can be understood that the RSTD is a minimum time difference between boundaries of two subframes of a reference cell and a measured cell. The RSTD is a relative time difference between a reference cell i and a neighboring cell j:

RSTD=$T$subframeRxj−$T$SubframeRxi, where TsubframeRxj represents a start time of a subframe that is of the cell j and that is received by the terminal, and TsubframeRxi represents a start time of a subframe that is nearest to the neighboring cell j of the cell i and that is received by the terminal.

The RSTD may be measured in intra-frequency cells and inter-frequency cells. Intra-frequency measurement refers to that the neighboring cell j and the reference cell i have a same frequency with a current serving cell. Inter-frequency measurement refers to that at least one of the reference cell i and the neighboring cell j is inconsistent with a current serving cell in frequency.

Figure 2:
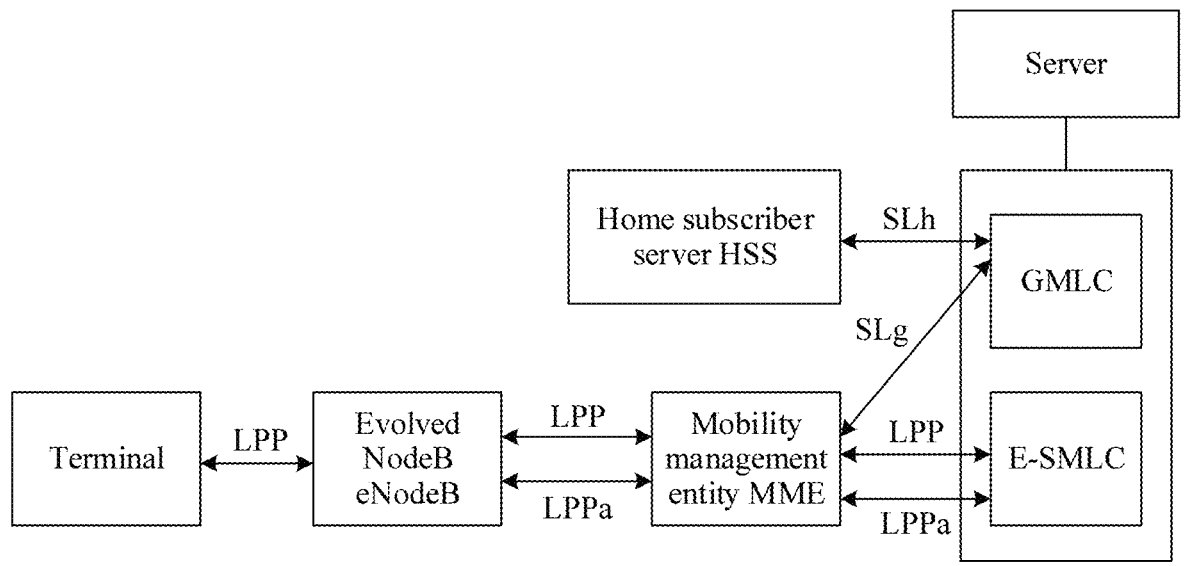
FIG. 2 is a schematic diagram of a system architecture of an OTDOA positioning method defined in 3GPP according to an embodiment of this application.

FIG. 2 is a schematic diagram of a system architecture of an OTDOA positioning method defined in a 3GPP standard. As shown in FIG. 2, the following network elements may be mainly included, but the following network elements are not limited thereto. The network elements are briefly described below.

Terminal: The terminal mainly measures OTDOA location information, and sends measured information to an E-SMLC using an LPP protocol.

eNodeB: The eNodeB mainly provides OTDOA location assistance data, for example, a PRS, and narrowband PRS (NPRS) configuration information.

E-SMLC: The E-SMLC is a location resolving center integrated with a location positioning algorithm, and calculates a terminal location using a location algorithm and a time difference of arrival of reference signals measured by the terminal. In an OTDOA location process, the E-SMLC obtains the location assistance data from the eNodeB using an LPPa protocol, and sends the location assistance data to the terminal using the LPP protocol.

MME: The Mobility Management Entity sends a location request message, receives location information, and reports the location information to a gateway mobile location center (GMLC).

GMLC: The GMLC is an interface network element in a non-3GPP network, triggers a location request message, and receives location information.

Figure 3:
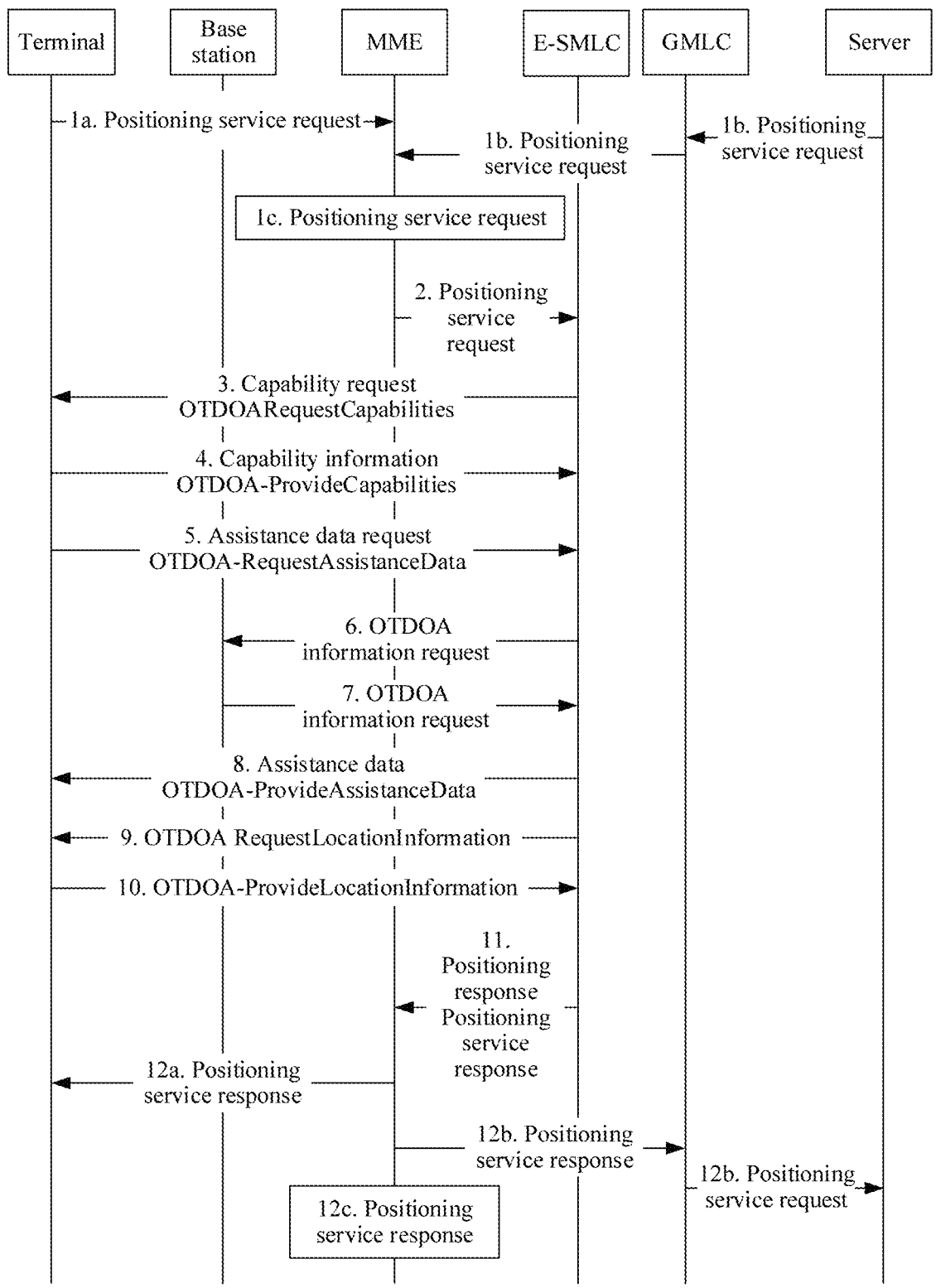
FIG. 3 is a schematic diagram of a terminal location procedure.

In a possible implementation, FIG. 3 is a schematic diagram of a terminal location procedure. A main location procedure is shown as follows.

1. The terminal triggers (step 1a)/A server triggers (step 1b)/A network triggers (step 1c) a location update request.

2. The MME sends the location update request to the E-SMLC.

3-4. The E-SMLC obtains a positioning capability of the terminal using the LPP protocol. For example, the positioning capability of the terminal may be whether to support an additional neighboring cell, whether to support inter-frequency RSTD measurement, and the like.

5-8. The terminal obtains measurement assistance data from the E-SMLC.

9-10. The terminal reports information such as measured RSTD to the E-SMLC, and the E-SMLC performs location resolving to obtain location information of the terminal.

11. The E-SMLC sends the location information of the terminal to the MME.

12. The MME sends the location information of the terminal to a corresponding location request network element. It may be understood that, if the terminal triggers the location update request at the beginning, the MME sends the location information of the terminal to the terminal. If the server triggers the location update request at the beginning, the MME sends the location information of the terminal to the server. If the network triggers the location update request at the beginning, the MME does not need to send the location information of the terminal.

In this technical solution, the terminal has high complexity, has high dependence on a network, and is relatively difficult to be deployed. The LPP protocol needs to be supported between the terminal and the E-SMLC. The LPPa protocol needs to be supported between the eNodeB and the E-SMLC. An E-SMLC network element needs to be deployed additionally.

In another possible implementation, a SUPL protocol may use an Internet Protocol (IP) network to transfer assistance information. A main difference from location by a control plane, that is, a base station, is that the SUPL protocol can be independent of a wireless communications network, is easy to implement, and has low costs.

Figure 4:
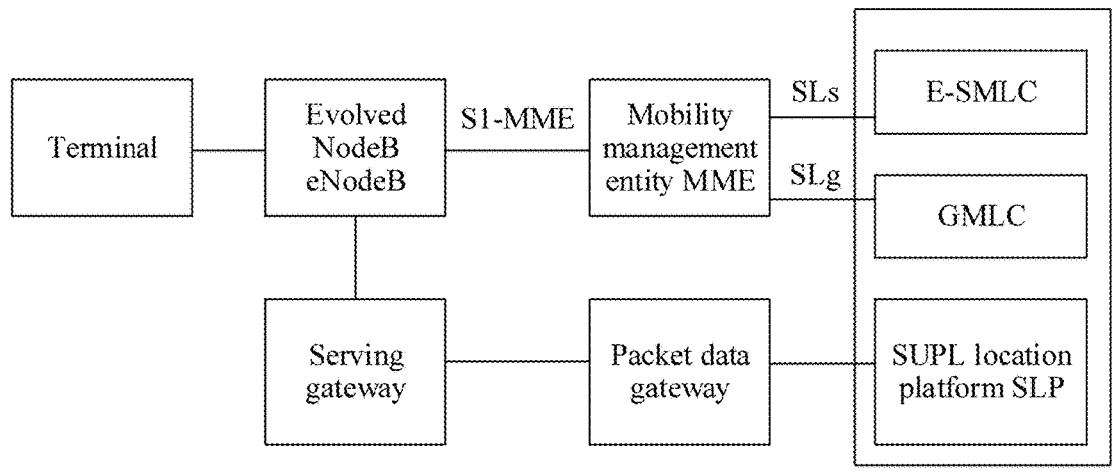
FIG. 4 is a schematic diagram of a system architecture of an OTDOA positioning method supported by Secure User Plane Location (SUPL) according to an embodiment of this application.

FIG. 4 is a schematic diagram of a system architecture of an OTDOA positioning method supported by SUPL according to an embodiment of this application. As shown in FIG. 4, a network element SUPL location platform (SLP) is responsible for processing all SUPL messages. In an LTE network, these SUPL messages are exchanged with a terminal in a data link using a packet data network (PDN) gateway (P-GW) and a serving gateway (S-GW). An LPP message is used as a payload of the SUPL message. In addition, the SLP obtains location assistance data using an interface between the SLP and the E-SMLC, and sends the assistance data to the terminal using an SUPL protocol.

In this technical solution, an OTDOA of a control plane is originally placed in a container, that is, in the SUPL protocol, and is transmitted using a user plane. This does not reduce terminal complexity, but increases the terminal complexity. The solution still does not resolve a problem that an eNodeB reports information to cooperate with the E-SMLC, and is still dependent on the E-SMLC network element for obtaining assistance data, calculating location information, and the like. An LPP protocol still needs to be supported by the terminal, and an LPPa protocol still needs to be supported between the eNodeB and the E-SMLC. In addition to an LPP protocol stack, the terminal further needs to support an SUPL protocol stack.

In this application, information required for OTDOA location is transmitted using a lightweight machine-to-machine (LwM2M) protocol such that user plane location is implemented, and network dependence is reduced. To be specific, the E-SMLC does not need to be deployed, and the eNodeB does not need to support the LPPa protocol and the like. This reduces terminal complexity (the LPP protocol does not need to be supported). Therefore, the OTDOA positioning method is more easily deployed, and has lower costs.

Figure 5:
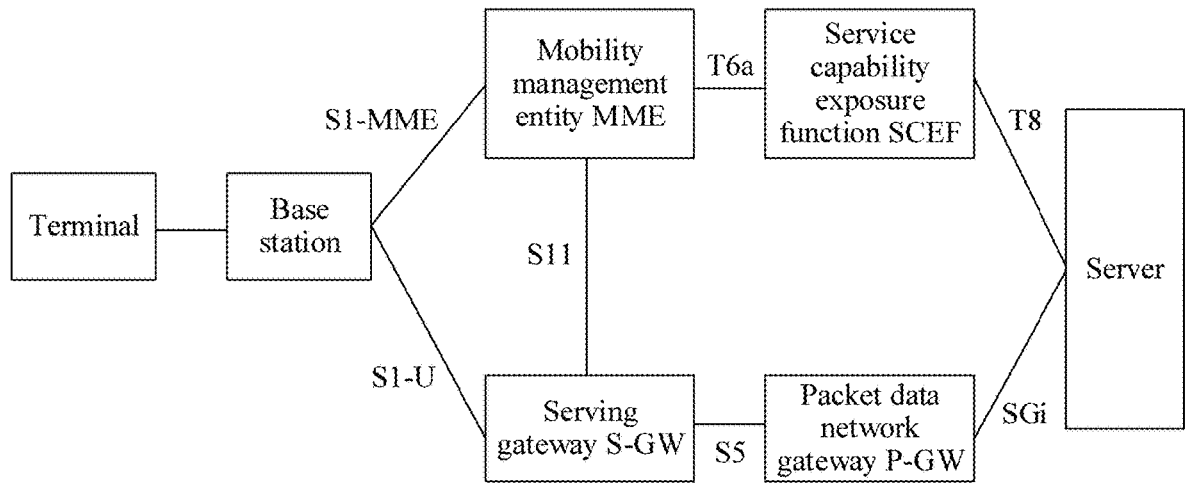
FIG. 5 is an architectural diagram of a system to which an embodiment of this application is applied.

FIG. 5 is an architectural diagram of a system to which an embodiment of this application is applied. In this embodiment of this application, if application layer data is an IP packet, the application layer data is sent to a server using an S-GW and a P-GW. A non-IP packet is sent to the server using an MME and a service capability exposure (service capability exposure function (SCEF)) network element. Optionally, the SCEF may further provide an assistance data query capability, and the SCEF queries a base station for assistance data using the MME. A general scenario to which this application is applied is that a terminal is located using an OTDOA positioning method.

As shown in FIG. 5, main network elements involved are as follows.

Terminal: The terminal mainly performs RSTD measurement for OTDOA location, and sends measured information to the server using an LwM2M protocol.

Server: The server selects a positioning method based on a service scenario and required accuracy. According to the OTDOA positioning method, the server obtains information about a neighboring cell base station based on cell information of the terminal, and sends the information about the neighboring cell base station to the terminal, or sends assistance data to the terminal after obtaining the assistance data.

Base station: The base station provides a measurement signal, and provides OTDOA location assistance data.

MME: The MME is used to obtain OTDOA location assistance data of target base stations, where the target base stations include the neighboring cell base station and a base station corresponding to the terminal.

SCEF: The SCEF provides a location assistance data query capability.

It should be noted that the server may be an entity server, or may be a virtual server on cloud, or may be another server. This is not limited. In an actual application, the server may be an Internet of things (IoT) platform or the like.

The terminal mentioned in this embodiment of this application may be a narrowband IoT (NB-IoT) terminal, user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, or a terminal device in a future $5^{th}$ generation (5G) network, or the like.

The cell mentioned in this embodiment of this application may be a cell corresponding to a base station. The cell may belong to a macro base station, or a base station corresponding to a small cell. The small cell herein may include a metro cell, a micro cell, a pico cell, a femto cell, and the like. These small cells are characterized by small coverage and a low transmit power, and are applicable to providing a high-rate data transmission service. A plurality of cells may work at a same frequency on a carrier in a wireless communications system. In some special scenarios, it may be considered that a concept of a carrier is equivalent to a concept of a cell in the wireless communications system. For example, in a carrier aggregation scenario, when a secondary carrier is configured for a terminal device, a carrier index of the secondary carrier and a cell identification (Cell ID) of a secondary cell working on the secondary carrier are carried. In this case, it may be considered that the concept of the carrier is equivalent to the concept of the cell. For example, that a terminal device accesses a carrier is equivalent to that a terminal device accesses a cell.

The base station mentioned in this embodiment of this application may be an LTE system, a next-generation mobile communications (New Radio (NR)) system, or an eNB or eNodeB, a macro base station, a micro base station (small cell), a femto base station, an access point (AP), a transmission point (TP), a new generation NodeB (gNodeB), or the like in a licensed-assisted access using an LTE (LAA-LTE) system.

In this embodiment of this application, in a solution 1, the terminal negotiates, with an IoT platform using an application layer protocol, information (a positioning capability, base station information, and the like) required for positioning. The terminal actively obtains assistance data and calculates a time difference of arrival of reference signals. The server integrates an OTDOA location calculation algorithm, and resolves the time difference of arrival of the reference signals, location information of the base station, and the like, to obtain final location information of the terminal. This solution reduces network element deployment (without a need of deploying an E-SMLC network element). The terminal and the base station no longer need to support an LPP protocol and an LPPa protocol. This reduces terminal complexity and network dependence.

Figure 6:
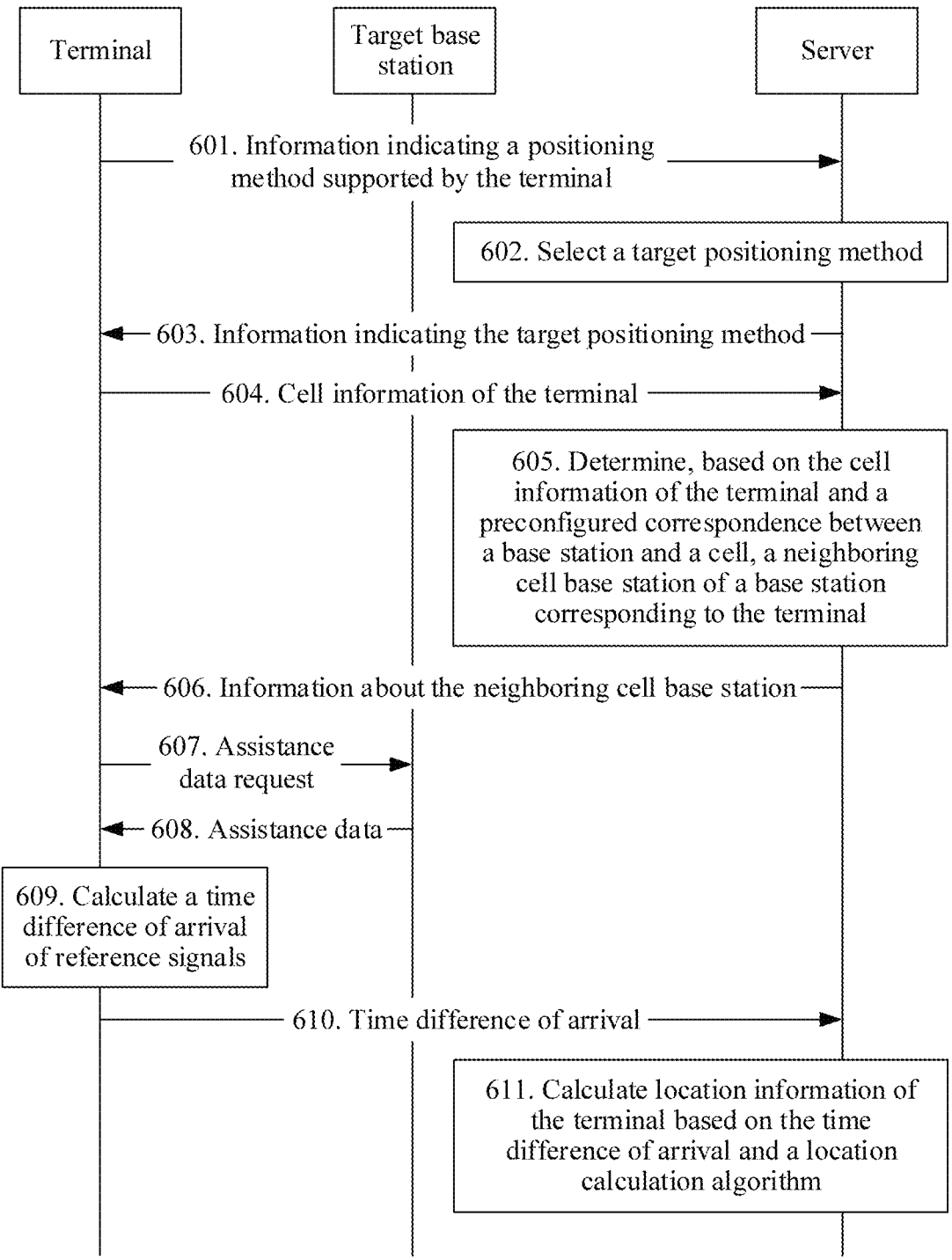
FIG. 6 is a schematic diagram of an embodiment of a positioning method according to an embodiment of this application.

The following further describes the technical solution 1 in this application using an embodiment. FIG. 6 is a schematic diagram of an embodiment of a positioning method according to an embodiment of this application. The method includes the following steps.

601. A terminal sends, to a server, information indicating at least one positioning method supported by the terminal.

The terminal may register with the server using an application layer protocol, and the terminal adds, to a registration request, the information indicating the at least one positioning method supported by the terminal. The supported positioning method may include information such as an OTDOA-location information object, an ECID-signal measurement information object (whose ID may be 10256), and a location object (whose ID may be 6). The OTDOA-location information object indicates that the terminal supports an OTDOA positioning method. The ECID-signal measurement information object indicates that the terminal supports an ECID positioning method. The location object indicates that the terminal supports a positioning method such as a GPS.

The application layer protocol may include a LwM2M protocol, a oneM2M protocol, a MODBUS protocol, an OPC Unified Architecture (OPC-UA) protocol, and the like, and is a protocol that may be applied to an unrestricted device. The lwM2M protocol is used as an example for description. The lwM2M protocol is a lightweight RESTful device management protocol, and supports an M2M device and a network environment that are with limited capabilities. The LwM2M defines a simple resource model, and each function is defined as an object (for example, Firmware Object, Connectivity Mgmt. Object, Location Object, and Sensor Object). Each piece of information defined by an LwM2M client is one resource, and the resource is placed into the object for transmission.

602. The server selects a target positioning method.

The server may determine, based on an object with which the terminal registers, a positioning capability supported by the terminal, and may select a proper target positioning method based on a service scenario and required precision. The target positioning method is selected by the server from the at least one positioning method supported by the terminal. For example, the target positioning method determined by the server herein is the OTDOA positioning method.

603. The server sends, to the terminal, information indicating the target positioning method.

After selecting the target positioning method, the server subscribes to a corresponding object. That is, the server subscribes to an OTDOA location object from the terminal using the application layer protocol. It should be noted that the object may include a plurality of attributes, and the target positioning method selected by the server may be written as an attribute in the OTDOA-location information object to be sent to the terminal. It should be noted that, that the server sends, to the terminal, the information indicating the target positioning method may be understood as that the server initiates a location request to the terminal.

604. The terminal sends cell information of the terminal to the server according to the selected target positioning method.

After receiving the subscription message, the terminal reports the corresponding cell information according to the selected target positioning method. The OTDOA method is selected in this application. Therefore, reported cell information of the terminal includes a location cell identifier, a physical cell ID (PCI), and an OTDOA positioning capability (OTDOA capability) of the terminal for the OTDOA method. For example, the location cell identifier may be an Evolved Universal Terrestrial Radio Access Network (E-UTRAN) cell global identifier (ECGI).

The OTDOA positioning capability may include, but is not limited to, whether to support inter-frequency RSTD measurement or whether to support an additional neighboring cell, for example, information about at most 3×24 neighboring cells. The cell information of the terminal may alternatively be written in to the OTDOA-location information object to be sent to the server. Because the server needs to obtain location assistance data based on the positioning capability of the terminal, and deliver the location assistance data to the terminal, the positioning capability needs to be reported to the server. In a scenario in which the terminal obtains the location assistance data, the server may alternatively determine, based on the positioning capability, a quantity of neighboring cell base stations whose information is to be delivered to the terminal.

It should be noted that the ECGI is used to determine the neighboring cell base station. The OTDOA capability is mainly used to indicate the OTDOA positioning capability of the terminal. An opaque type is defined in the object, that is, an internal structure of the OTDOA capability is opaque for the LwM2M. For the internal structure of the OTDOA capability, reference may be completely made to a definition of an OTDOA-provide capability (OTDOA-provide capabilities) in the 3GPP. Details are not described herein.

605. The server determines, based on the cell information of the terminal and a preconfigured correspondence between a base station and a cell, a neighboring cell base station of a serving base station corresponding to the terminal.

The server determines, based on the cell information of the terminal and the preconfigured correspondence between a base station and a cell, the neighboring base station of the serving base station corresponding to the terminal such that the terminal can measure a time difference of arrival of reference signals sent by the serving base station and the neighboring cell base station. For example, the preconfigured correspondence between a base station and a cell is shown in the following Table 1.

TABLE 1

| Base station | Cell |
| --- | --- |
| Base station 1 | Cell 1, cell 2, and cell 3 |
| Base station 2 | Cell 4, cell 5, and cell 6 |
| Base station 3 | Cell 7, and cell 8 |
| Base station 4 | Cell 9, and cell 10 |

It should be noted that, the server further stores information about each base station and information about a neighboring cell base station of the base station. After the server first determines, based on the cell information of the terminal, the serving base station corresponding to the terminal, the server may determine, based on a stored correspondence between each base station and the neighboring cell base station of the base station, the neighboring cell base station of the serving base station corresponding to the terminal. The server determines at least two neighboring cell base stations.

606. The server sends information about the neighboring cell base station to the terminal.

After determining the neighboring cell base station of the serving base station corresponding to the terminal, the server may send the information about the neighboring cell base station to the terminal using the application layer protocol. The information about the neighboring cell base station may include, but is not limited to, information such as a PCI. The terminal may access a corresponding base station by listening to the information. The information about the neighboring cell base station may alternatively be written in the OTDOA-location information object to be sent to the server.

607. The terminal sends an assistance data request to target base stations based on the information about the neighboring cell base station.

After receiving the information about the neighboring base station, the terminal starts an assistance data obtaining procedure. To be specific, the terminal requests to obtain assistance data from the corresponding base station using a newly added message in a Radio Resource Control (RRC) protocol, that is, an OTDOA information request. The target base stations herein include the serving base station corresponding to the terminal and the neighboring cell base station. It should be noted that there are at least two neighboring cell base stations. Herein, in addition to sending the assistance data request to the serving base station corresponding to the terminal, the terminal also sends the assistance data request to the neighboring cell base station.

608. The target base stations send assistance data to the terminal.

After receiving the assistance data request sent by the terminal, the target base stations return the assistance data to the terminal. The assistance data may include, but is not limited to, a reference signal bandwidth, a physical cell ID, a cell global identifier, and configuration information of a reference signal.

It may be understood that the assistance data may be used by the terminal to identify the reference signal. For a specific parameter of the assistance data, refer to a definition of OTDOA-provide assistance data in the 3GPP. Details are not described herein.

609. The terminal calculates a time difference of arrival of reference signals sent by the target base stations.

The terminal identifies, based on the location assistance data, the reference signal separately sent by the serving base station corresponding to the terminal and the neighboring cell base station. The terminal calculates the time difference of arrival based on time at which the reference signal separately sent by the serving base station and the neighboring cell base station arrives at the terminal. That is, the time difference of arrival is a difference between time at which the terminal receives the reference signals.

It should be noted that, herein, for a specific manner of calculating the time difference of arrival of the reference signals, refer to the foregoing description of Formula (1-2). Details are not described herein.

610. The terminal sends the time difference of arrival to the server.

The terminal may report the time difference of arrival of the reference signals to the server using the application layer protocol such as the LwM2M protocol. The time difference of arrival of the reference signals may alternatively be written in the OTDOA-location information object to be sent to the server.

611. The server calculates location information of the terminal based on the time difference of arrival and the location calculation algorithm.

An IoT platform calculates the location information of the terminal based on a measurement result, the location calculation algorithm, and coordinates of the target base stations (the serving base station corresponding to the terminal and the neighboring cell base station). It can be understood that, in the algorithm, input data may include information such as the time difference of arrival, the coordinates of the serving base station corresponding to the terminal, and the coordinates of the neighboring cell base station of the serving base station corresponding to the terminal, and the location information of the terminal is output using the location calculation algorithm. For details, refer to the foregoing description of Formula (1-3). Details are not described herein. The location information of the terminal herein is geographical location information, that is, latitude and longitude information.

It should be noted that the server stores information such as the coordinates of the serving base station corresponding to the terminal, the coordinates of the neighboring cell base station of the serving base station corresponding to the terminal, sending time at which the serving base station and the neighboring cell base station separately send the reference signals to the terminal, and the time at which the terminal receives the reference signals. The sending time at which the serving base station and the neighboring cell base station separately send the reference signals to the terminal and the time at which the terminal receives the reference signals may be obtained by the server from the serving base station and the neighboring cell base station, or may be actively sent by the serving base station and the neighboring cell base station to the server, or may be obtained in another manner. This is not limited.

In this embodiment of this application, in a process in which the server locates the terminal, the terminal actively obtains the assistance data from the serving base station and the neighboring cell base station. This reduces network dependence. An E-SMLC network element does not need to be deployed, and the base station does not need to support an LPPa protocol, therefore, terminal complexity is reduced, and the terminal does not need to support an LPP protocol.

Figure 7A:
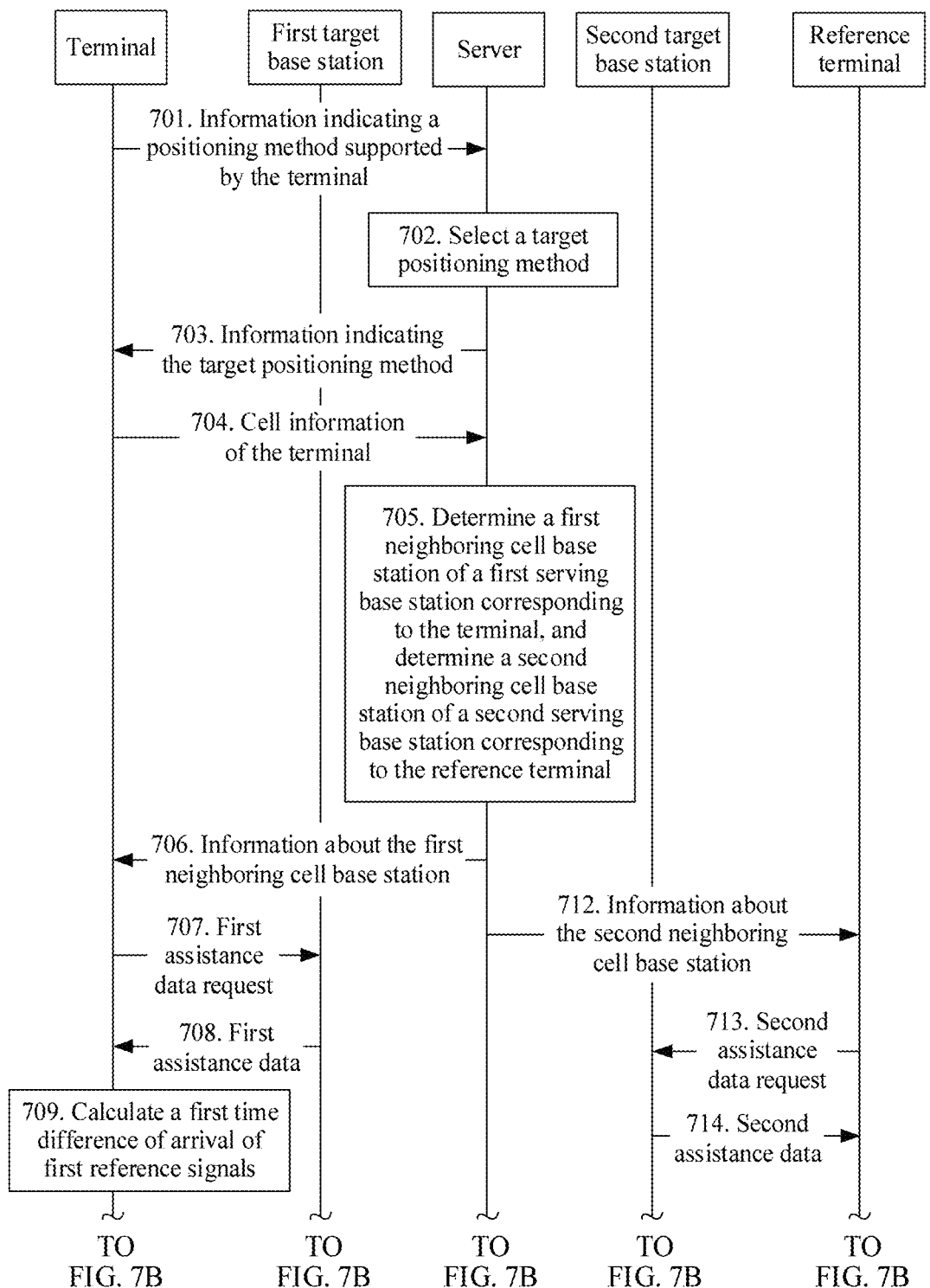
FIG. 7A and FIG. 7B are a schematic diagram of another embodiment of a positioning method according to an embodiment of this application.
Figure 7B:
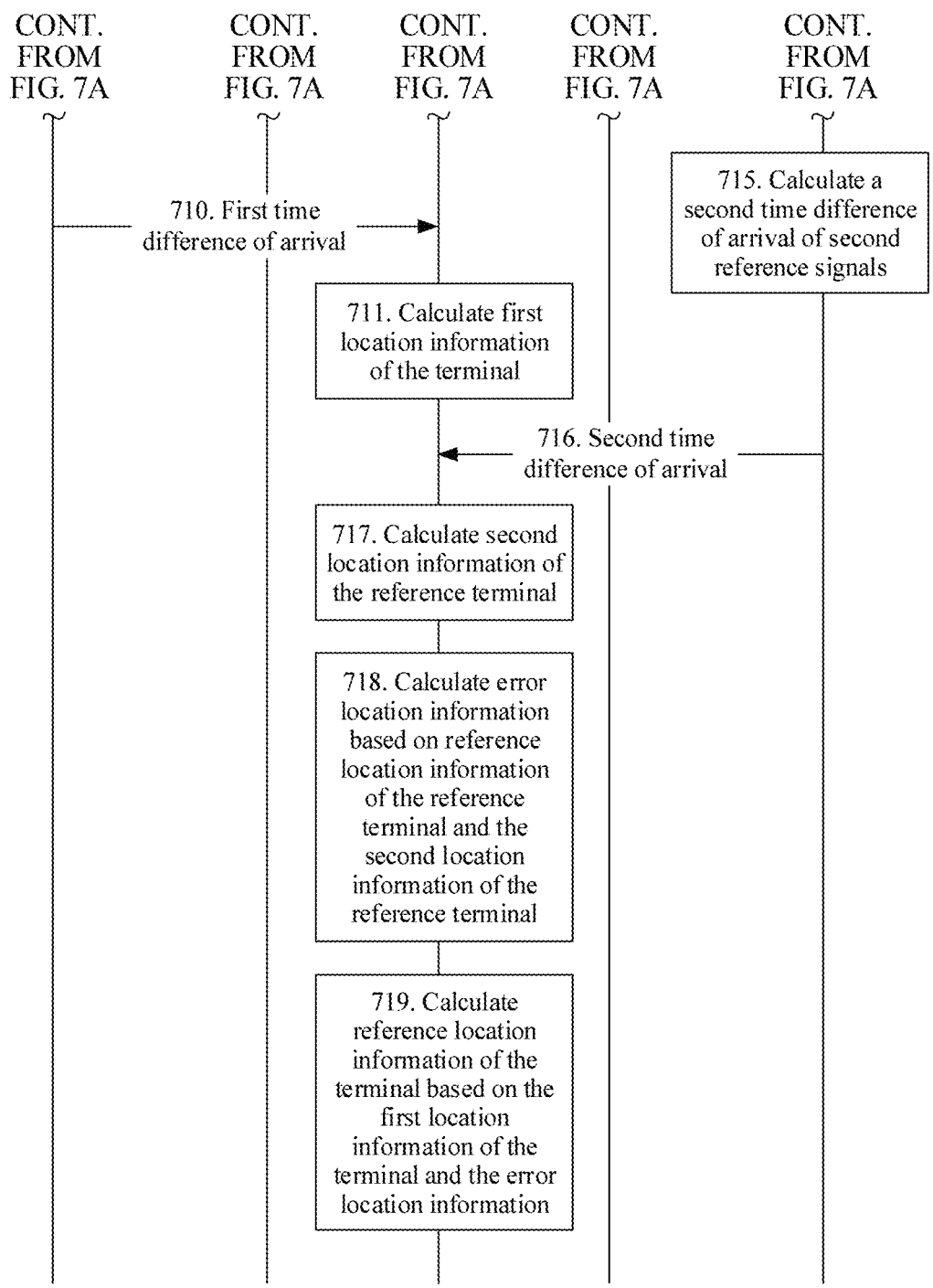

FIG. 7A and FIG. 7B are a schematic diagram of another embodiment of a positioning method according to an embodiment of this application. The method includes the following steps.

701. A terminal sends, to a server, information indicating at least one positioning method supported by the terminal.

702. The server selects a target positioning method.

703. The server sends, to the terminal, information indicating the target positioning method.

704. The terminal sends cell information of the terminal to the server according to the selected target positioning method.

It should be noted that step 701 to step 704 are similar to step 601 to step 604 in this embodiment shown in FIG. 6. Details are not described herein.

705. The server determines, based on the cell information of the terminal and a preconfigured correspondence between a base station and a cell, a first neighboring cell base station of a first serving base station corresponding to the terminal, selects a reference terminal from preconfigured reference nodes, and determines a second neighboring cell base station of a second serving base station corresponding to the reference terminal.

It should be noted that, for a specific process in which the server determines, based on the cell information of the terminal and a preconfigured correspondence between a base station and a cell, a first neighboring cell base station of a first serving base station corresponding to the terminal, refer to the description of step 605 in this embodiment shown in FIG. 6. Details are not described herein.

Herein, in addition to determining the first neighboring cell base station of the first serving base station corresponding to the terminal, the server may further select the reference terminal from the preconfigured reference nodes. It can be understood that the server stores location information of some terminals as reference location information, and these terminals may be considered as the reference nodes. Therefore, the server may select one or more terminals from the preconfigured reference nodes as the reference terminal, and then determines the second neighboring cell base station of the second serving base station corresponding to the reference terminal. There are at least two second neighboring cell base stations.

Optionally, an implementation in which the server may select one or more terminals from the preconfigured reference nodes as the reference terminal includes that the server may select, from the preconfigured reference nodes as the reference terminal, a terminal included in the first serving base station corresponding to the terminal, or a terminal that is the same as the first serving base station corresponding to the terminal and that is the same as the second neighboring cell base station and the first neighboring cell base station. There may be another selecting manner. This is not limited.

706. The server sends information about the first neighboring cell base station to the terminal.

707. The terminal sends a first assistance data request to a first target base station based on the information about the first neighboring cell base station, where the first target base station includes the first serving base station and the first neighboring cell base station.

708. The first target base station sends first assistance data to the terminal.

709. The terminal calculates a first time difference of arrival of first reference signals sent by the first target base station.

710. The terminal sends the first time difference of arrival to the server.

711. The server calculates first location information of the terminal based on the first time difference of arrival and a location calculation algorithm.

It should be noted that step 706 to step 711 are similar to step 606 to step 611 in this embodiment shown in FIG. 6, and reference may be made to the description in this embodiment shown in FIG. 6. Details are not described herein.

712. The server sends information about the second neighboring cell base station to the reference terminal.

713. The reference terminal sends a second assistance data request to a second target base station based on the information about the second neighboring cell base station, where the second target base station includes the second serving base station and the second neighboring cell base station.

714. The second target base station sends second assistance data to the reference terminal.

715. The reference terminal calculates a second time difference of arrival of second reference signals sent by the second target base station.

716. The reference terminal sends the second time difference of arrival to the server.

717. The server calculates second location information of the reference terminal based on the second time difference of arrival and the location calculation algorithm.

It should be noted that step 712 to step 717 are similar to step 606 to step 611 in this embodiment shown in FIG. 6. However, the reference terminal is described in step 712 to step 717, reference may also be made to the description in this embodiment shown in FIG. 6. Details are not described herein. A time sequence of step 712 to step 717 and a time sequence of step 706 to step 711 are not limited.

718. The server calculates error location information based on reference location information of the reference terminal and the second location information of the reference terminal.

The server calculates the error location information based on the reference location information of the reference terminal stored in a fingerprint database and the second location information of the reference terminal. The second location information calculated in step 717 is current location information of the reference terminal. If the server determines that the reference location information of the reference terminal is the same as the second location information of the reference terminal, it proves that there is no error, and it indicates that reliability of the first location information of the terminal is also relatively high such that the first location information of the terminal can be used as reference location information of the terminal. If the server determines that the reference location information of the reference terminal is different from the second location information of the reference terminal, it proves that an error exists. The server calculates the error location information, and further calculates reference location information of the terminal based on the error local information and the first location information of the terminal.

719. The server calculates the reference location information of the terminal based on the first location information of the terminal and the error location information.

If the error location information is the reference location information of the reference terminal minus the second location information, the reference location information of the terminal is the first location information plus the error location information. If the error location information is the second location information minus the reference location information of the reference terminal, the reference location information of the terminal is the first location information minus the error location information. The error location information may be a positive number, may be a negative number, or may be 0.

Optionally, it should be noted that the terminal reports, to the server, information indicating reference signal strength. The reference signal strength may include, but is not limited to, PRS strength and NPRS strength.

The server may further determine, based on a mobility attribute of the terminal, whether the terminal may be used as a reference node. If the terminal may be used as the reference node, the server stores the reference signal strength and the location information of the terminal, and constructs a fingerprint database corresponding to the reference signal strength parameter and the location information of the terminal. The fingerprint database is used for subsequently positioning a terminal. It can be understood that, the fingerprint database is constructed for some relatively simple terminals that may have only an ECID positioning capability. Precision of the positioning method depends on the fingerprint database. When there are many fingerprint nodes in the fingerprint database, positioning precision of the positioning method is high, otherwise, positioning precision is low. Therefore, if the fingerprint database is constructed, and a node quantity in the fingerprint database is increased, positioning precision of a subsequent node can be improved.

In this embodiment of this application, network dependence is mainly reduced. No E-SMLC network element needs to be deployed, and the base station does not need to support an LPPa protocol such that terminal complexity is reduced because the terminal does not need to support an LPP protocol, and positioning precision can be further improved.

In a solution 2, a server obtains measurement assistance data using an SCEF exposure capability, and delivers the related assistance data to a terminal using an application layer protocol. The terminal calculates a time difference of arrival of reference signals based on the assistance data. A platform integrates an OTDOA location calculation algorithm, and resolves the time difference of arrival of the reference signals, location information of a base station, and the like, to obtain final location information of the terminal. In this solution, network element deployment (no E-SMLC network element needs to be deployed) is reduced, and the terminal and the base station do not need to support LPP and LPPa protocols. This reduces terminal complexity, and reduces messages exchanged between the terminal and another network element, thereby reducing terminal consumption.

Figure 8:
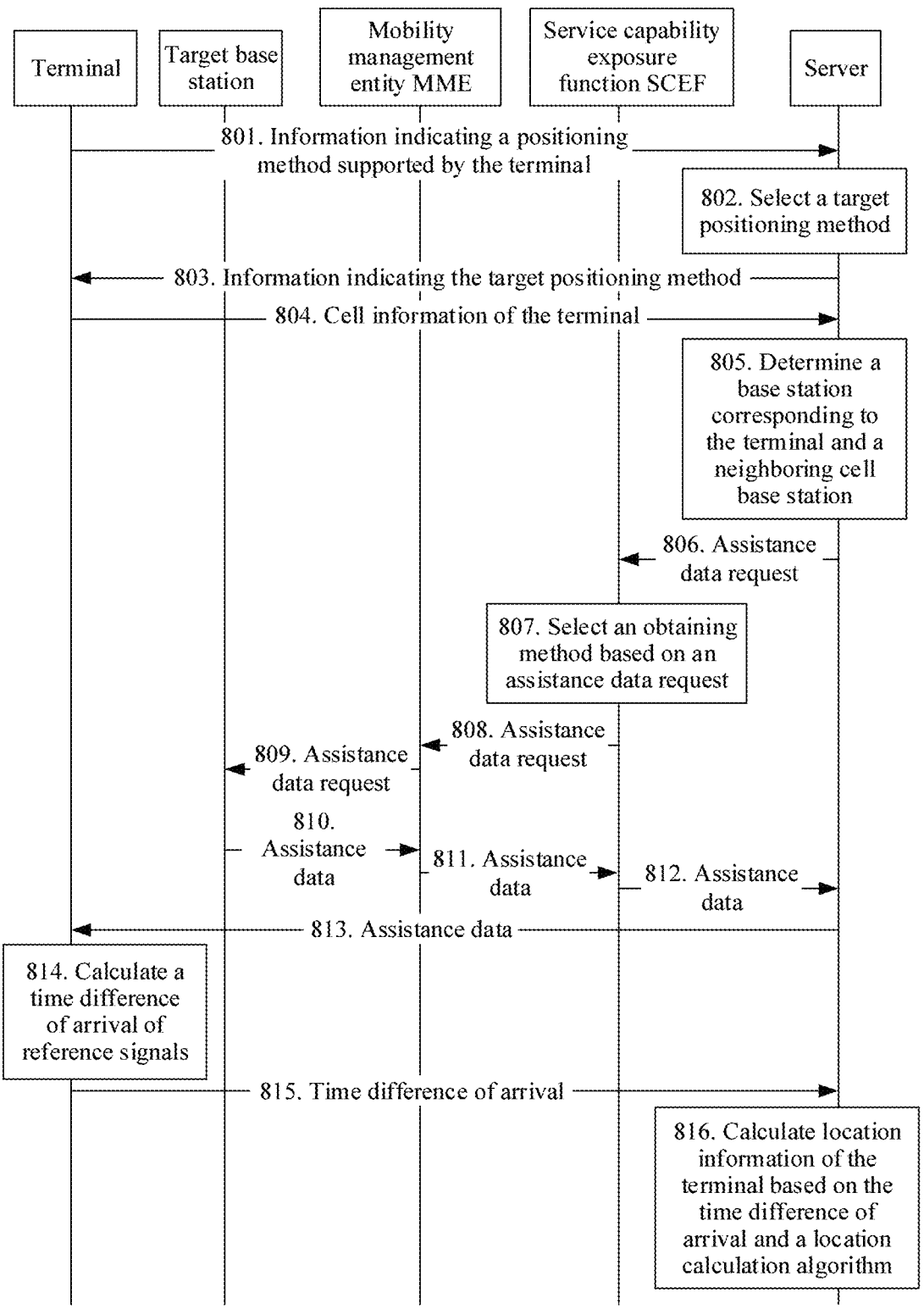
FIG. 8 is a schematic diagram of another embodiment of a positioning method according to an embodiment of this application.

The following further describes the technical solution 2 in this application using an embodiment. FIG. 8 is a schematic diagram of another embodiment of a positioning method according to an embodiment of this application. The method includes the following steps.

801. The terminal sends, to the server, information indicating at least one positioning method supported by the terminal.

802. The server selects a target positioning method.

803. The server sends, to the terminal, information indicating the target positioning method.

804. The terminal sends cell information of the terminal to the server according to the selected target positioning method.

It should be noted that step 801 to step 804 are similar to step 601 to step 604 in this embodiment shown in FIG. 6. Details are not described herein.

805. The server determines, based on the cell information of the terminal and a preconfigured correspondence between a base station and a cell, a neighboring cell base station of a serving base station corresponding to the terminal.

In this embodiment of this application, the server determines, based on the cell information of the terminal and the preconfigured correspondence between a base station and a cell, a base station corresponding to the terminal and the neighboring cell base station of the serving base station corresponding to the terminal. For the preconfigured correspondence between a base station and a cell, refer to Table 1. Details are not described herein.

806. The server sends an assistance data request to the SCEF.

The server requests the SCEF to query a location assistance data. A specific implementation may be as follows. The server sends the assistance data request (an OTDOA-assistant request) to the SCEF network element. The assistance data request carries identifiers of the serving base station and the neighboring cell base station. Target base stations include the serving base station corresponding to the terminal and the neighboring cell base station. Alternatively, the server newly adds a monitoring type OTDOA-assistant (OTDOA-assistant) data to a monitoring event application programming interface (API) message. The capability is newly added and needs to be supported by the SCEF.

It can be understood that the server stores identifiers of the base stations and a correspondence between a base station and an MME, and adds identifiers of the target base stations and identifiers of MMEs corresponding to the target base stations to the assistance data request. In this case, the SCEF may forward the assistance data request to a corresponding MME based on the identifier of the MME. The target base stations include the serving base station and the neighboring cell base station. Then, the MMEs send the assistance data request to the corresponding target base stations based on the identifiers of the target base stations, to obtain assistance data. Alternatively, the assistance data request carries the identifiers of the target base stations, and the SCEF network element also stores a correspondence between a target base station and an MME. In this case, the SCEF may determine a corresponding MME based on the identifiers of the target base stations, and send the assistance data request to the MME, and then the MME determines target base stations based on the identifiers of the target base stations, and sends the assistance data request to the target base stations in order to obtain the assistance data. Alternatively, there may be another implementation. This is not limited herein.

807. The SCEF selects an obtaining method based on the assistance data request.

A specific implementation in which the SCEF selects, based on the assistance data request, the method for obtaining the assistance data may include, but is not limited to, the following several implementations.

(1) The SCEF searches a preconfigured assistance data set based on the assistance data request to obtain the assistance data.

(2) The SCEF may obtain the assistance data from an Operations Support Systems (OSS) interface based on the assistance data request.

(3) The SCEF may also request, using the MME based on the assistance data request, to obtain the assistance data from the base station.

If the SCEF learns, using preconfigured information or the OSS interface, that the target base stations do not have capabilities of providing the location assistance data, the SCEF notifies the server that the base station does not support the capability such that the server reselects a positioning method. That is, the SCEF returns error local information to the server, to indicate that the base station cannot obtain the location assistance data. It should be noted that step 807 is an optional step.

The following describes an example in which the SCEF may request, using the MME, to obtain the assistance data from the base station. Refer to the description in the following step 808 to step 811.

808. The SCEF sends the assistance data request to the MME.

If the SCEF obtains the assistance data using the MME, the SCEF may directly send the assistance data request to the MME, or may add the monitoring type OTDOA-assistant to a configuration information request message, or may use another implementation. This is not limited.

809. The MME sends the assistance data request to the target base stations.

The MME receives the assistance data request sent by the SCEF, and may send the assistance data request to the serving base station corresponding to the terminal and the neighboring cell base station. Alternatively, the MME receives the configuration information request, and if the monitoring type is OTDOA-assistant, the MME actively obtains the assistance data from the neighboring cell base station of the serving base station corresponding to the terminal. A newly added message is an eNB configuration request (eNB configuration request), and the monitoring type is OTDOA-assistant.

810. The target base stations send the assistance data to the MME.

The target base stations include the serving base station corresponding to the terminal and the neighboring cell base station. After receiving the assistance data request, the target base stations send the assistance data to the MME based on the assistance data request.

Optionally, the target base stations may send the assistance data to the MME using an eNB configuration response message.

811. The MME sends the assistance data to the SCEF.

After receiving the assistance data sent by the target base stations, the MME may directly send the assistance data to the SCEF, or may send the assistance data to the SCEF using a configuration information response message.

812. The SCEF sends the assistance data to the server.

After receiving the assistance data, the SCEF may directly send the assistance data to the server, or may send the assistance data (OTDOA-assistant) to the server using the monitoring event API message.

813. The server sends the assistance data to the terminal.

The server may send the assistance data to the terminal using the application layer protocol. The assistance data may be written in an OTDOA-location information object to be sent to the server. The application layer protocol may include a LwM2M protocol, a oneM2M protocol, a MOD-BUS protocol, an OPC-UA protocol, and the like, and is a protocol that may be applied to an unrestricted device.

814. The terminal calculates a time difference of arrival of reference signals sent by the target base stations.

815. The terminal sends the time difference of arrival to the server.

816. The server calculates location information of the terminal based on the time difference of arrival and the location calculation algorithm.

It should be noted that step 814 to step 816 are similar to step 609 to step 611 in this embodiment shown in FIG. 6, and reference may be made to the foregoing description. Details are not described herein.

In this embodiment of this application, in the process in which the server locates the terminal, the server obtains the assistance data using the SCEF, and then delivers the assistance data to the terminal. This reduces network dependence. No E-SMLC network element needs to be deployed, and the base station does not need to support the LPPa protocol such that terminal complexity is reduced. The terminal does not need to support the LPP protocol such that terminal power consumption is also reduced, and message sending of the terminal is reduced.

Figure 9:
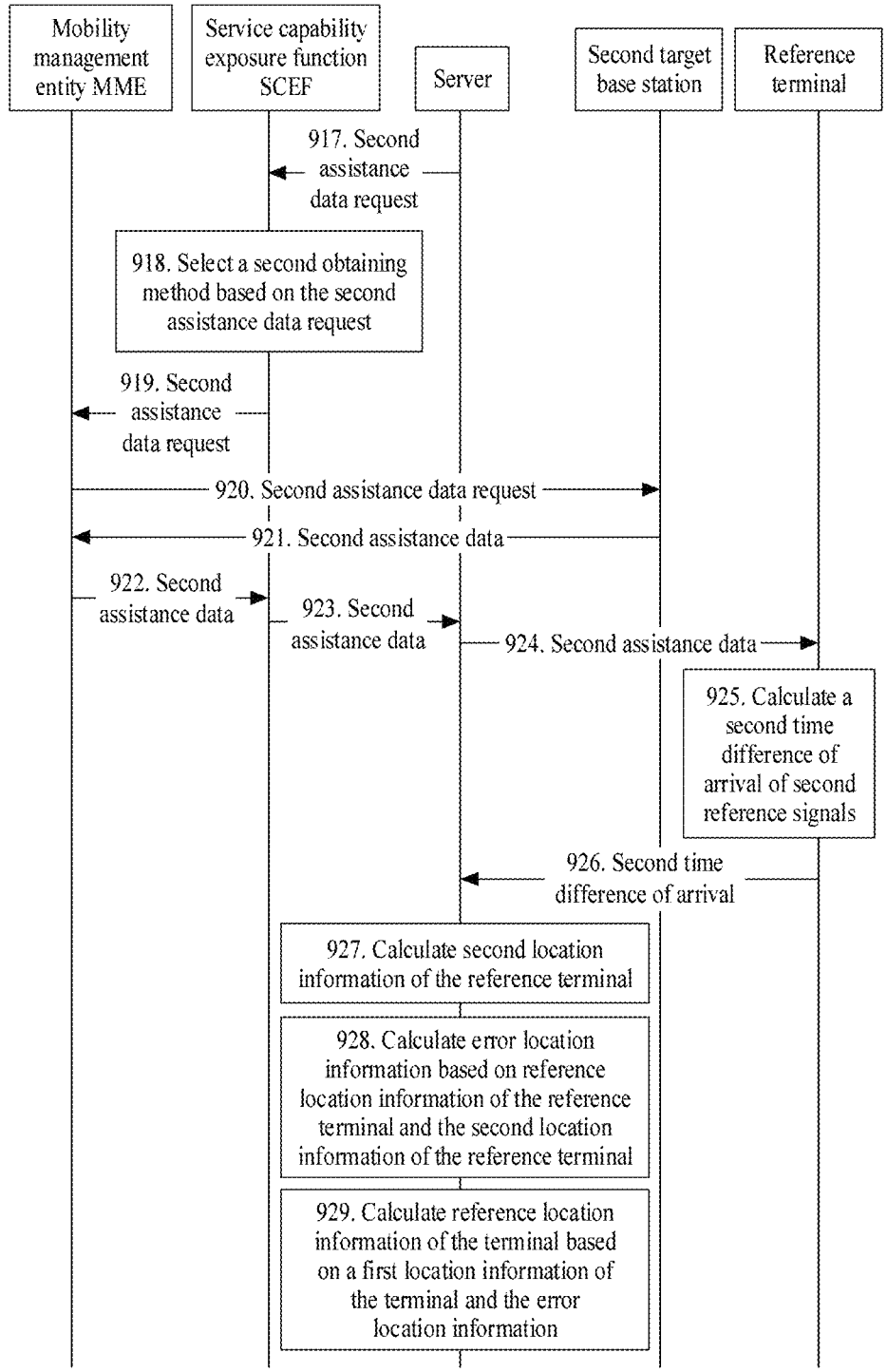
FIG. 9 is a schematic diagram of another embodiment of a positioning method according to an embodiment of this application.

FIG. 9 is a schematic diagram of another embodiment of a positioning method according to an embodiment of this application. The method includes the following steps.

It should be noted that, for step 917 to step 929, and step 901 to step 916 shown in FIG. 9, refer to the foregoing schematic diagram in FIG. 8.

901. A terminal sends, to a server, information indicating at least one positioning method supported by the terminal.

902. The server selects a target positioning method.

903. The server sends, to the terminal, information indicating the target positioning method.

904. The terminal sends cell information of the terminal to the server according to the selected target positioning method.

It should be noted that step 901 to step 904 are similar to step 601 to step 604 in this embodiment shown in FIG. 6. Details are not described herein.

905. The server determines, based on the cell information of the terminal and a preconfigured correspondence between a base station and a cell, a first neighboring cell base station of a first serving base station corresponding to the terminal, selects a reference terminal from preconfigured reference nodes, and determines a second neighboring cell base station of a second serving base station corresponding to the reference terminal.

It should be noted that step 905 is similar to step 705 in the embodiment shown in FIG. 7A. Details are not described herein.

906. The server sends a first assistance data request to an SCEF.

907. The SCEF selects a first obtaining method based on the first assistance data request.

908. The SCEF sends the first assistance data request to an MME.

909. The MME sends the first assistance data request to a first target base station, where the first target base station includes the first serving base station and the first neighboring cell base station.

910. The first target base station sends first assistance data to the MME.

911. The MME sends the first assistance data to the SCEF.

912. The SCEF sends the first assistance data to the server.

913. The server sends the first assistance data to the terminal.

914. The terminal calculates a first time difference of arrival of first reference signals sent by the first target base station.

915. The terminal sends the first time difference of arrival to the server.

916. The server calculates first location information of the terminal based on the first time difference of arrival and a location calculation algorithm.

It should be noted that step 906 to step 916 are similar to step 806 to step 816 in this embodiment shown in FIG. 8, and reference may be made to the description in this embodiment shown in FIG. 8. Details are not described herein.

917. The server sends a second assistance data request to the SCEF.

918. The SCEF selects a second obtaining method based on the second assistance data request.

919. The SCEF sends the second assistance data request to the MME.

920. The MME sends the second assistance data request to a second target base station, where the second target base station includes the second serving base station and the second neighboring cell base station.

921. The second target base station sends second assistance data to the MME.

922. The MME sends the second assistance data to the SCEF.

923. The SCEF sends the second assistance data to the server.

924. The server sends the second assistance data to the reference terminal.

925. The reference terminal calculates a second time difference of arrival of second reference signals sent by the second target base station.

926. The reference terminal sends the second time difference of arrival to the server.

927. The server calculates second location information of the reference terminal based on the second time difference of arrival and the location calculation algorithm.

It should be noted that step 917 to step 927 are similar to step 806 to step 816 in this embodiment shown in FIG. 8. However, the reference terminal is described in step 917 to step 927, reference may also be made to the description in this embodiment shown in FIG. 8. Details are not described herein. A time sequence of step 906 to step 916 and a time sequence of step 917 to step 927 are not limited.

928. The server calculates error location information based on reference location information of the reference terminal and the second location information of the reference terminal.

929. The server calculates reference location information of the terminal based on the first location information of the terminal and the error location information.

It should be noted that step 928 to step 929 are similar to step 718 to step 719 in this embodiment shown in FIG. 7B. Details are not described herein.

Optionally, it should be noted that the terminal reports, to the server, information indicating reference signal strength. The reference signal strength may include, but is not limited to, PRS strength and NPRS strength.

The server may further determine, based on a mobility attribute of the terminal, whether the terminal may be used as a reference node. If the terminal may be used as the reference node, the server stores the reference signal strength and the location information of the terminal, and constructs a fingerprint database corresponding to the reference signal strength parameter and the location information of the terminal. The fingerprint database is used for subsequently positioning a terminal. It can be understood that, the fingerprint database is constructed for some relatively simple terminals that may have only an ECID positioning capability. Precision of the positioning method depends on the fingerprint database. When there are many fingerprint nodes in the fingerprint database, positioning precision of the positioning method is high, otherwise, positioning precision is low. Therefore, if the fingerprint database is constructed, and a node quantity in the fingerprint database is increased, positioning precision of a subsequent node can be improved.

In this embodiment of this application, in the process in which the server locates the terminal, the server obtains the assistance data using the SCEF, and then delivers the assistance data to the terminal. This reduces network dependence. No E-SMLC network element needs to be deployed, and the base station does not need to support the LPPa protocol such that terminal complexity is reduced. The terminal does not need to support the LPP protocol such that terminal power consumption is also reduced, and message sending of the terminal is reduced. Therefore, positioning precision can be further improved.

Figure 10:
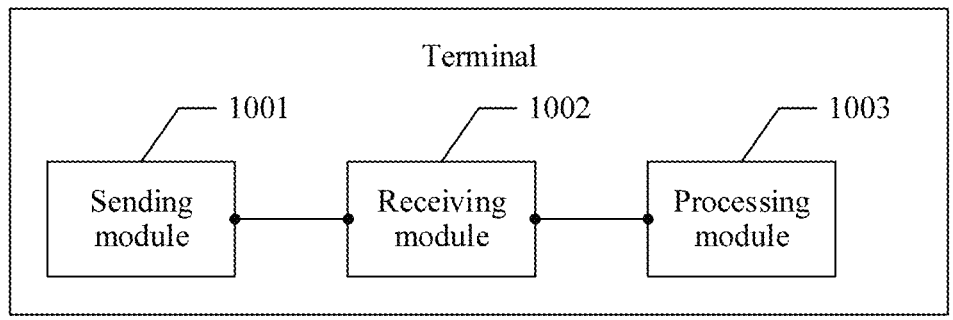
FIG. 10 is a schematic diagram of an embodiment of a terminal according to an embodiment of this application.

The foregoing describes the positioning method in the embodiments of this application, and the following describes a terminal in an embodiment of this application. FIG. 10 is a schematic diagram of an embodiment of a terminal according to an embodiment of this application. The terminal includes a sending module 1001 configured to send a request for obtaining assistance data to a serving base station and a neighboring cell base station separately, a receiving module 1002 configured to receive assistance data separately sent by the serving base station and the neighboring cell base station, and a processing module 1003 configured to identify, based on the assistance data, reference signal separately sent by the serving base station and the neighboring cell base station, and calculate a time difference of arrival based on time at which the reference signal separately sent by the serving base station and the neighboring cell base station arrive at the terminal, where the sending module 1001 is further configured to send the time difference of arrival to a server using an application layer protocol, where the time difference of arrival is used by the server to calculate location information of the terminal.

Optionally, in some embodiments of this application, the time difference of arrival is a difference between time at which the terminal receives the reference signals.

Optionally, in some embodiments of this application, the receiving module 1002 is configured to receive, using the application layer protocol, information about the neighboring cell base station sent by the server.

Optionally, in some embodiments of this application, the sending module 1001 is further configured to send a registration request to the server using the application layer protocol, and the registration request includes information indicating at least one positioning method supported by the terminal, the receiving module 1002 is further configured to receive, using the application layer protocol, information that is sent by the server and that indicates a target positioning method, where the target positioning method is a positioning method selected by the server from the at least one positioning method supported by the terminal, and the sending module 1001 is further configured to send cell information to the server according to the target positioning method.

Optionally, in some embodiments of this application, the sending module 1001 is further configured to send, to the server using the application layer protocol, information indicating reference signal strength, the reference signal strength is used by the server to establish a fingerprint database, and the fingerprint database includes a mapping relationship between reference signal strength and location information of the terminal.

Optionally, in some embodiments of this application, there are at least two neighboring cell base stations.

Figure 11:
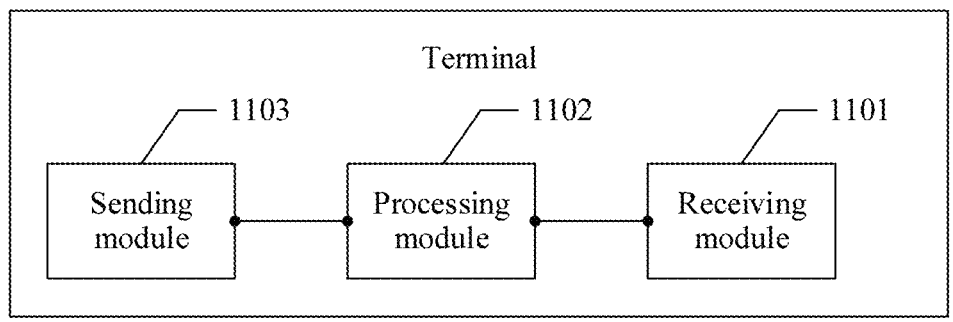
FIG. 11 is a schematic diagram of another embodiment of a terminal according to an embodiment of this application.

FIG. 11 is a schematic diagram of an embodiment of a terminal according to an embodiment of this application. The terminal includes a receiving module 1101 configured to receive, using an application layer protocol, assistance data sent by a server, a processing module 1102 configured to identify, based on the assistance data, reference signal separately sent by a serving base station and a neighboring cell base station, and calculate a time difference of arrival based on time at which the reference signal separately sent by the serving base station and the neighboring cell base station arrive at the terminal, and a sending module 1103 configured to send the time difference of arrival to the server using the application layer protocol, where the time difference of arrival is used by the server to calculate location information of the terminal.

Optionally, in some embodiments of this application, the time difference of arrival is a difference between time at which the terminal receives the reference signals.

Optionally, in some embodiments of this application, the sending module 1103 is further configured to send a registration request to the server using the application layer protocol, and the registration request includes information indicating at least one positioning method supported by the terminal, the receiving module 1101 is further configured to receive, using the application layer protocol, information that is sent by the server and that indicates a target positioning method, where the target positioning method is a positioning method selected by the server from the at least one positioning method supported by the terminal, and the sending module 1103 is further configured to send cell information to the server according to the target positioning method.

Optionally, in some embodiments of this application, the sending module 1103 is further configured to send, to the server using the application layer protocol, information indicating reference signal strength, the reference signal strength is used by the server to establish a fingerprint database, and the fingerprint database includes a mapping relationship between reference signal strength and location information of the terminal.

Optionally, in some embodiments of this application, there are at least two neighboring cell base stations.

Figure 12:
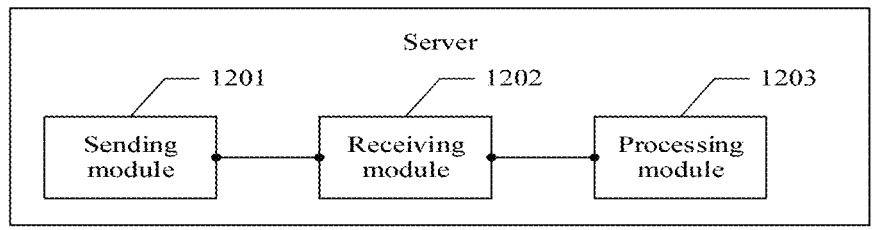
FIG. 12 is a schematic diagram of an embodiment of a server according to an embodiment of this application.

FIG. 12 is a schematic diagram of an embodiment of a server according to an embodiment of this application. The server includes a sending module 1201 configured to send information about a first neighboring cell base station to a terminal using an application layer protocol, where the first neighboring cell base station is a neighboring base station of a first serving base station corresponding to the terminal, a receiving module 1202 configured to receive, using the application layer protocol, a first time difference of arrival sent by the terminal, where the first time difference of arrival is a time difference of arrival that is calculated by the terminal based on time at which first reference signal separately sent by the first serving base station and the first neighboring cell base station arrive at the terminal, and a processing module 1203 configured to calculate first location information of the terminal based on the first time difference of arrival and a preconfigured location calculation algorithm.

Optionally, in some embodiments of this application, the first time difference of arrival is a difference between time at which the terminal receives the first reference signals.

Optionally, in some embodiments of this application, the receiving module 1202 is further configured to receive, using the application layer protocol, a registration request sent by the terminal, and the registration request includes information indicating at least one positioning method supported by the terminal, the sending module 1201 is further configured to send, to the terminal using the application layer protocol, information indicating a target positioning method, where the target positioning method is a positioning method selected by the server from the at least one positioning method supported by the terminal, and the receiving module 1202 is further configured to receive, using the application layer protocol, cell information sent by the terminal.

Optionally, in some embodiments of this application, the processing module 1203 is further configured to determine the first neighboring cell base station based on the cell information and a preconfigured mapping relationship between a cell and a base station.

Optionally, in some embodiments of this application, the sending module 1201 is further configured to send information about a second neighboring cell base station to a reference terminal using the application layer protocol, the second neighboring cell base station is a neighboring base station of a second serving base station corresponding to the reference terminal, and the second serving base station corresponding to the reference terminal is the same as the first serving base station corresponding to the terminal, the receiving module 1202 is further configured to receive, using the application layer protocol, a second time difference of arrival sent by the reference terminal, where the second time difference of arrival is a time difference of arrival that is calculated by the reference terminal based on time at which second reference signal separately sent by the second serving base station and the second neighboring cell base station arrive at the terminal, and the processing module 1203 is further configured to calculate second location information of the reference terminal based on the second time difference of arrival and the preconfigured location calculation algorithm, and determine error location information based on reference location information of the reference terminal stored in a fingerprint database and the second location information of the reference terminal.

Optionally, in some embodiments of this application, the processing module 1203 is further configured to calculate first reference location information of the terminal based on the error location information and the first location information.

Optionally, in some embodiments of this application, the receiving module 1202 is further configured to receive, using the application layer protocol, information that is sent by the terminal and that indicates first reference signal strength, and the processing module 1203 is further configured to establish the fingerprint database based on the first reference signal strength and the first location information of the terminal.

Figure 13:
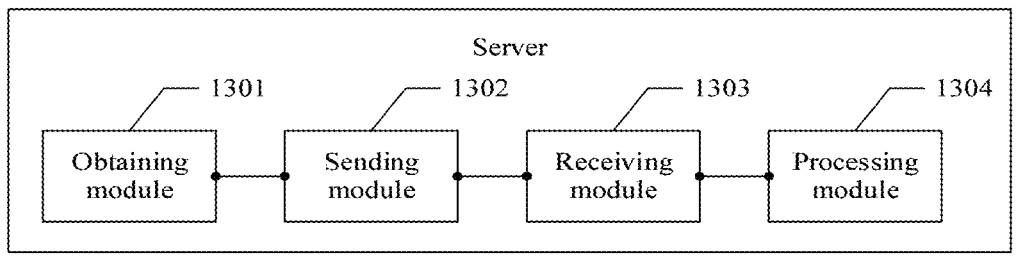
FIG. 13 is a schematic diagram of another embodiment of a server according to an embodiment of this application.

FIG. 13 is a schematic diagram of an embodiment of a server according to an embodiment of this application. The server includes an obtaining module 1301 configured to obtain first assistance data, a sending module 1302 configured to send the first assistance data to a terminal using an application layer protocol, a receiving module 1303 configured to receive, using the application layer protocol, a first time difference of arrival sent by the terminal, where the first time difference of arrival is a time difference of arrival that is calculated by the terminal based on time at which first reference signal separately sent by a first serving base station and a first neighboring cell base station arrive at the terminal, and the first neighboring cell base station is a neighboring base station of the first serving base station corresponding to the terminal, and a processing module 1304 configured to calculate first location information of the terminal based on the first time difference of arrival and a preconfigured location calculation algorithm.

Optionally, in some embodiments of this application, the first time difference of arrival is a difference between time at which the terminal receives the first reference signals.

Optionally, in some embodiments of this application, the obtaining module 1301 is further configured to send a first assistance data request to a service capability exposure network element, where the first assistance data request includes identifiers of the first serving base station and the first neighboring cell base station, and receive the first assistance data sent by the service capability exposure network element.

Optionally, in some embodiments of this application, the receiving module 1303 is further configured to receive, using the application layer protocol, a registration request sent by the terminal, and the registration request includes information indicating at least one positioning method supported by the terminal, the sending module 1302 is further configured to send, to the terminal using the application layer protocol, information indicating a target positioning method, where the target positioning method is a positioning method selected by the server from the at least one positioning method supported by the terminal, and the receiving module 1303 is further configured to receive, using the application layer protocol, cell information sent by the terminal.

Optionally, in some embodiments of this application, the processing module 1304 is further configured to determine the first neighboring cell base station based on the cell information and a preconfigured mapping relationship between a cell and a base station.

Optionally, in some embodiments of this application, the obtaining module 1301 is further configured to obtain second assistance data, the sending module 1302 is further configured to send the second assistance data to a reference terminal using the application layer protocol, where a second serving base station corresponding to the reference terminal is the same as the first serving base station corresponding to the terminal, the receiving module 1303 is further configured to receive, using the application layer protocol, a second time difference of arrival sent by the reference terminal, where the second time difference of arrival is a time difference of arrival that is calculated by the reference terminal based on time at which second reference signal separately sent by the second serving base station and a second neighboring cell base station arrive at the terminal, and the second neighboring cell base station is a neighboring base station of the second serving base station corresponding to the reference terminal, and the processing module 1304 is further configured to calculate second location information of the reference terminal based on the second time difference of arrival and the preconfigured location calculation algorithm, and determine error location information based on reference location information of the reference terminal stored in a fingerprint database and the second location information of the reference terminal.

Optionally, in some embodiments of this application, the obtaining module 1301 is further configured to send a second assistance data request to the service capability exposure network element, where the second assistance data request includes identifiers of the second serving base station and the second neighboring cell base station, and receive the second assistance data sent by the service capability exposure network element.

Optionally, in some embodiments of this application, the processing module 1304 is further configured to calculate first reference location information of the terminal based on the error location information and the first location information.

Optionally, in some embodiments of this application, the receiving module 1303 is further configured to receive, using the application layer protocol, information that is sent by the terminal and that indicates first reference signal strength, and the processing module 1304 is further configured to establish the fingerprint database based on the first reference signal strength and the first location information of the terminal.

Figure 14:
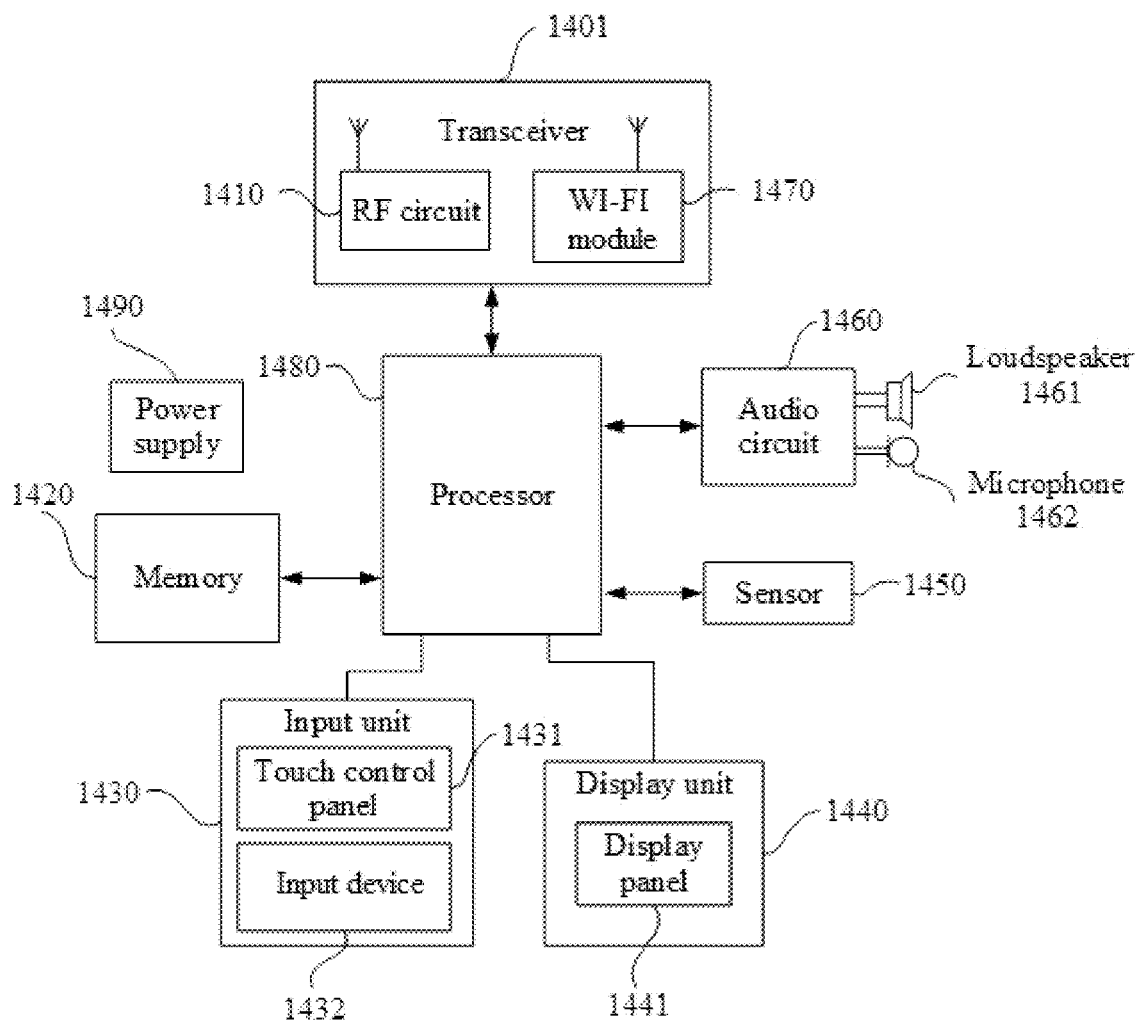
FIG. 14 is a schematic diagram of another embodiment of a terminal according to an embodiment of this application.

FIG. 14 is a schematic structural diagram of an apparatus for implementing a function of a terminal according to an embodiment of this application. The apparatus includes at least a transceiver 1401, a memory 1420, and a processor 1480. The transceiver 1401 includes at least one of a radio frequency (RF) circuit 1410 and a WI-FI module 1470. Optionally, the apparatus may further include components such as an input unit 1430, a display unit 1440, a sensor 1450, an audio circuit 1460, and a power supply 1490. Persons skilled in the art may understand that the terminal structure shown in FIG. 14 does not constitute any limitation on the terminal. The terminal may include more or fewer components than those shown in the figure, or some components may be combined, or a different component deployment may be used. A specific form of the apparatus shown in FIG. 14 may be user equipment of a type such as a mobile phone, or may be a module or a chip having a function of the terminal in the embodiments of this application. This is not further limited in this embodiment of this application.

The following describes each component of the apparatus shown in FIG. 14 in detail.

The RF circuit 1410 may be configured to receive and send a signal in an information receiving/sending process or a call process. In particular, after receiving downlink information from a base station, the RF circuit 1410 sends the downlink information to the processor 1480 for processing. In addition, the RF circuit 1410 sends involved uplink data to the base station. The RF circuit 1410 usually includes, but is not limited to, an antenna, at least one amplifier, a transceiver, a coupler, a low-noise amplifier (LNA), a duplexer, and the like. In addition, the RF circuit 1410 may further communicate with a network and another device using wireless communication. The wireless communication may use any communications standard or protocol, including but not limited to a Global System for Mobile Communications (GSM), a General Packet Radio Service (GPRS), code-division multiple access (CDMA), wideband CDMA (WCDMA), LTE, an email, a short message service (SMS), and the like.

The memory 1420 may be configured to store a software program and a module. The processor 1480 runs the software program and the module that are stored in the memory 1420, to perform various function applications of the terminal and data processing in the embodiments of this application. The memory 1420 may mainly include a program storage area and a data storage area. The program storage area may store an operating system, an application program, and the like. The data storage area may also store data created based on use of the apparatus, and the like. In addition, the memory 1420 may include a high-speed RAM, and may further include a nonvolatile memory, such as at least one magnetic disk storage component, a flash memory component, or another volatile solid-state storage component.

The input unit 1430 may be configured to receive input digit or character information, and generate a key signal input related to a user setting and function control of the terminal. Further, the input unit 1430 may include a touch control panel 1431 and another input device 1432. Optionally, the touch control panel 1431 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 1480, and can receive and execute a command sent by the processor 1480. In addition, the touch control panel 1431 may be a resistive, capacitive, infrared, or surface acoustic touch control panel. In addition to the touch control panel 1431, the input unit 1430 may include an input device 1432. Further, the input device 1432 may include, but is not limited to, one or more of a physical keyboard, a function key (such as a volume control key or an on/off key), a trackball, a mouse, a joystick, and the like.

A display unit 1440 may be configured to display information entered by a user or information provided for the user, and various menus of the terminal. The display unit 1440 may include a display panel 1441. Optionally, the display panel 1441 may be configured in a form such as a liquid-crystal display (LCD) or an organic light-emitting diode (OLED). Further, the touch control panel 1431 may cover the display panel 1441. When detecting a touch operation on or near the touch control panel 1431, the touch control panel 1431 transmits the touch operation to the processor 1480 to determine a type of a touch event, and then the processor 1480 provides corresponding visual output on the display panel 1441 based on the type of the touch event. Although in FIG. 14, the touch control panel 1431 and the display panel 1441 are used as two independent components to implement input and output functions of the terminal, in some embodiments, the touch control panel 1431 and the display panel 1441 may be integrated to implement the input and output functions of the terminal.

The terminal may further include at least one sensor 1450 such as a light sensor, a motion sensor, and another sensor. As a type of motion sensor, an acceleration sensor can detect a value of an acceleration in each direction (generally three axes), and detect a value and a direction of gravity when the acceleration sensor is static, and is applicable to an application for recognizing a terminal posture (for example, switching between a landscape screen and a portrait screen, related games, and magnetometer posture calibration), a function related to vibration recognition (such as a pedometer or a knock), and the like. Other sensors such as a gyroscope, a barometer, a hygrometer, a thermometer, and an infrared sensor may also be disposed on the terminal. Details are not described herein.

The audio circuit 1460, a loudspeaker 1461, and a microphone 1462 may provide an audio interface between the user and the terminal. The audio circuit 1460 may convert received audio frequency data into an electrical signal, and transmits the electrical signal to the loudspeaker 1461, and the loudspeaker 1461 converts the electrical signal into a voice signal for output. In addition, the microphone 1462 converts a collected voice signal into an electrical signal, the audio circuit 1460 receives the electrical signal, converts the electrical signal into audio frequency data, and outputs the audio frequency data to the processor 1480 for processing in order to send the audio frequency data to, for example, another terminal, using the RF circuit 1410, or output the audio frequency data to the memory 1420 for further processing.

WI-FI is a short-range wireless transmission technology, and the terminal may help, using the WI-FI module 1470, the user to send and receive an email, browse a web page, access streaming media, and the like. The WI-FI module 1470 provides wireless broadband internet access for the user. Although FIG. 14 shows the WI-FI module 1470, it can be understood that the WI-FI module 1470 is not a necessary constituent of the terminal and may be omitted well as required provided that the essence of the present disclosure is not changed.

The processor 1480 is a control center of the terminal, and connects all parts of the entire terminal using various interfaces and lines. By running or executing a software program and/or a module stored in the memory 1420 and invoking data stored in the memory 1420, the processor 1480 performs various functions of the terminal and data processing, to perform overall monitoring on the terminal. Optionally, the processor 1480 may include one or more processing units. An application processor and a modem processor may be integrated in the processor 1480. The application processor mainly processes an operating system, a user interface, an application program, and the like. The modem processor mainly processes wireless communication. It can be understood that the modem processor may not be integrated into the processor 1480.

The terminal further includes the power supply 1490 (such as a battery) for supplying power to the components. The power supply may be logically connected to the processor 1480 using a power supply management system, thereby implementing functions, such as charging, discharging, and power consumption management, using the power supply management system.

Although not shown in the figure, the terminal may further include a camera, a Bluetooth module, and the like. Details are not described herein.

The steps performed by the terminal in the foregoing embodiments may be based on the terminal structure shown in FIG. 14.

An implementation solution is shown as follows.

The transceiver 1401 is configured to send a request for obtaining assistance data to a serving base station and a neighboring cell base station separately, receive assistance data separately sent by the serving base station and the neighboring cell base station, send a time difference of arrival to a server using an application layer protocol, where the time difference of arrival is used by the server to calculate location information of the terminal.

The processor 1480 is configured to identify, based on the assistance data, reference signal separately sent by the serving base station and the neighboring cell base station, and calculate the time difference of arrival based on time at which the reference signal separately sent by the serving base station and the neighboring cell base station arrive at the terminal.

Optionally, in some embodiments of this application, the time difference of arrival is a difference between time at which the terminal receives the reference signals.

Optionally, in some embodiments of this application, the transceiver 1401 is further configured to receive, using the application layer protocol, information about the neighboring cell base station sent by the server.

Optionally, in some embodiments of this application, the transceiver 1401 is further configured to send a registration request to the server using the application layer protocol, where the registration request includes information indicating at least one positioning method supported by the terminal, receive, using the application layer protocol, information that is sent by the server and that indicates a target positioning method, where the target positioning method is a positioning method selected by the server from the at least one positioning method supported by the terminal, and send cell information to the server according to the target positioning method.

Optionally, in some embodiments of this application, the transceiver 1401 is further configured to send, to the server using the application layer protocol, information indicating strength of the reference signal, the reference signal strength is used by the server to establish a fingerprint database, and the fingerprint database includes a mapping relationship between the strength of the reference signal and location information of the terminal.

Optionally, in some embodiments of this application, there are at least two neighboring cell base stations.

Another implementation solution is shown as follows.

The transceiver 1401 is configured to receive, using an application layer protocol, assistance data sent by the server, send a time difference of arrival to the server using the application layer protocol, where the time difference of arrival is used by the server to calculate location information of the terminal.

The processor 1480 is configured to identify, based on the assistance data, reference signal separately sent by a serving base station and a neighboring cell base station, and calculate the time difference of arrival based on time at which the reference signal separately sent by the serving base station and the neighboring cell base station arrive at the terminal.

Optionally, in some embodiments of this application, the time difference of arrival is a difference between time at which the terminal receives the reference signals.

Optionally, in some embodiments of this application, the transceiver 1401 is further configured to send a registration request to the server using the application layer protocol, where the registration request includes information indicating at least one positioning method supported by the terminal, receive, using the application layer protocol, information that is sent by the server and that indicates a target positioning method, where the target positioning method is a positioning method selected by the server from the at least one positioning method supported by the terminal, and send cell information to the server according to the target positioning method.

Optionally, in some embodiments of this application, the transceiver 1401 is further configured to send, to the server using the application layer protocol, information indicating strength of the reference signal, the reference signal strength is used by the server to establish a fingerprint database, and the fingerprint database includes a mapping relationship between the strength of the reference signal and location information of the terminal.

Optionally, in some embodiments of this application, there are at least two neighboring cell base stations.

Figure 15:
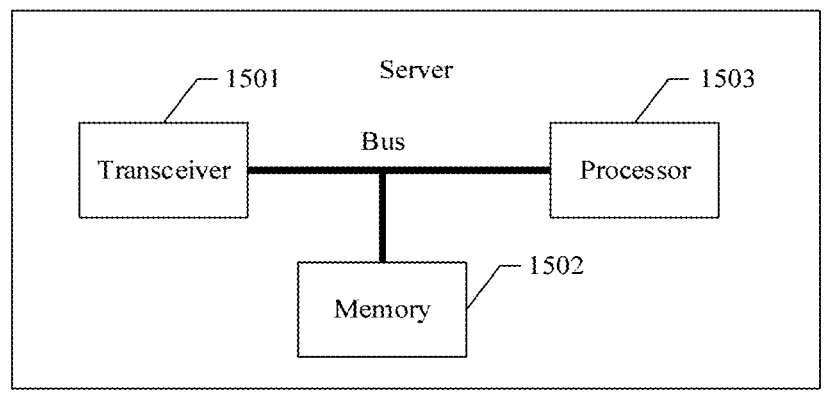
FIG. 15 is a schematic diagram of another embodiment of a server according to an embodiment of this application.

FIG. 15 is a schematic structural diagram of a server according to an embodiment of this application.

The server may include a transceiver 1501, a memory 1502, and a processor 1503, and the transceiver 1501, the memory 1502, and the processor 1503 are connected to each other using a bus. Steps performed by the server in the foregoing embodiments may be based on the server structure shown in FIG. 15.

An implementation solution is shown as follows.

The transceiver 1501 is configured to send information about a first neighboring cell base station to a terminal using an application layer protocol, where the first neighboring cell base station is a neighboring base station of a first serving base station corresponding to the terminal, and receive, using the application layer protocol, a first time difference of arrival sent by the terminal, where the first time difference of arrival is a time difference of arrival that is calculated by the terminal based on time at which first reference signal separately sent by the first serving base station and the first neighboring cell base station arrive at the terminal.

The processor 1503 is configured to calculate first location information of the terminal based on the first time difference of arrival and a preconfigured location calculation algorithm.

Optionally, in some embodiments of this application, the first time difference of arrival is a difference between time at which the terminal receives the first reference signals.

Optionally, in some embodiments of this application,

The transceiver 1501 is further configured to receive, using the application layer protocol, a registration request sent by the terminal, where the registration request includes information indicating at least one positioning method supported by the terminal, send, to the terminal using the application layer protocol, information indicating a target positioning method, where the target positioning method is a positioning method selected by the server from the at least one positioning method supported by the terminal, and receive, using the application layer protocol, cell information sent by the terminal.

Optionally, in some embodiments of this application, the processor 1503 is further configured to determine the first neighboring cell base station based on the cell information and a preconfigured mapping relationship between a cell and a base station.

Optionally, in some embodiments of this application, the transceiver 1501 is further configured to send information about a second neighboring cell base station to a reference terminal using the application layer protocol, where the second neighboring cell base station is a neighboring base station of a second serving base station corresponding to the reference terminal, and the second serving base station corresponding to the reference terminal is the same as the first serving base station corresponding to the terminal, receive, using the application layer protocol, a second time difference of arrival sent by the reference terminal, where the second time difference of arrival is a time difference of arrival that is calculated by the reference terminal based on time at which second reference signal separately sent by the second serving base station and the second neighboring cell base station arrive at the terminal, and the processor 1503 is further configured to calculate second location information of the reference terminal based on the second time difference of arrival and the preconfigured location calculation algorithm, and determine error location information based on reference location information of the reference terminal stored in a fingerprint database and the second location information of the reference terminal.

Optionally, in some embodiments of this application, the processor 1503 is further configured to calculate first reference location information of the terminal based on the error location information and the first location information.

Optionally, in some embodiments of this application, the transceiver 1501 is further configured to receive, using the application layer protocol, information that is sent by the terminal and that indicates strength of the first reference signal, and the processor 1503 is further configured to establish the fingerprint database based on the first reference signal strength and the first location information of the terminal.

Another implementation solution is shown as follows.

The transceiver 1501 is configured to obtain first assistance data, send the first assistance data to a terminal using an application layer protocol, receive, using the application layer protocol, a first time difference of arrival sent by the terminal, where the first time difference of arrival is a time difference of arrival that is calculated by the terminal based on time at which first reference signal separately sent by a first serving base station and a first neighboring cell base station arrive at the terminal, and the first neighboring cell base station is a neighboring base station of the first serving base station corresponding to the terminal.

The processor 1503 is configured to calculate first location information of the terminal based on the first time difference of arrival and a preconfigured location calculation algorithm.

Optionally, in some embodiments of this application, the first time difference of arrival is a difference between time at which the terminal receives the first reference signals.

Optionally, in some embodiments of this application, the transceiver 1501 is further configured to send a first assistance data request to a service capability exposure network element, where the first assistance data request includes identifiers of the first serving base station and the first neighboring cell base station, and receive the first assistance data sent by the service capability exposure network element.

Optionally, in some embodiments of this application, the transceiver 1501 is further configured to receive, using the application layer protocol, a registration request sent by the terminal, where the registration request includes information indicating at least one positioning method supported by the terminal, send, to the terminal using the application layer protocol, information indicating a target positioning method, where the target positioning method is a positioning method selected by the server from the at least one positioning method supported by the terminal, and receive, using the application layer protocol, cell information sent by the terminal.

Optionally, in some embodiments of this application, the processor 1503 is further configured to determine the first neighboring cell base station based on the cell information and a preconfigured mapping relationship between a cell and a base station.

Optionally, in some embodiments of this application, the transceiver 1501 is further configured to obtain second assistance data, send the second assistance data to a reference terminal using the application layer protocol, where a second serving base station corresponding to the reference terminal is the same as the first serving base station corresponding to the terminal, receive, using the application layer protocol, a second time difference of arrival sent by the reference terminal, where the second time difference of arrival is a time difference of arrival that is calculated by the reference terminal based on time at which second reference signal separately sent by the second serving base station and a second neighboring cell base station arrive at the terminal, and the second neighboring cell base station is a neighboring base station of the second serving base station corresponding to the reference terminal, and the processor 1503 is further configured to calculate second location information of the reference terminal based on the second time difference of arrival and the preconfigured location calculation algorithm, and determine error location information based on reference location information of the reference terminal stored in a fingerprint database and the second location information of the reference terminal.

Optionally, in some embodiments of this application, the transceiver 1501 is further configured to send a second assistance data request to the service capability exposure network element, where the second assistance data request includes identifiers of the second serving base station and the second neighboring cell base station, and receive the second assistance data sent by the service capability exposure network element.

Optionally, in some embodiments of this application, the processor 1503 is further configured to calculate first reference location information of the terminal based on the error location information and the first location information.

Optionally, in some embodiments of this application, the transceiver 1501 is further configured to receive, using the application layer protocol, information that is sent by the terminal and that indicates strength of the first reference signal, and the processor 1503 is further configured to establish the fingerprint database based on the first reference signal strength and the first location information of the terminal.

All or some of the foregoing embodiments may be implemented using software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in the form of a software product. The computer software product is stored in a storage medium and includes several instructions for instructing a computer device (which may include a personal computer, a server, or a network device) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method implemented by a terminal and comprising:
   sending, to a server and using an application layer protocol, a registration request comprising information indicating positioning methods supported by the terminal;
   receiving, from the server and using the application layer protocol, information indicating a target positioning method selected from the positioning methods;
   sending, to the server and according to the target positioning method, cell information;
   receiving, from a serving base station and a neighboring cell base station, assistance data;
   identifying, based on the assistance data, a first reference signal from the serving base station and a second reference signal from the neighboring cell base station;
   calculating a time difference of arrival based on times at which the first reference signal and the second reference signal arrive at the terminal; and
   sending, to the sever and using the application layer protocol, the time difference to enable the server to calculate location information of the terminal.

2. The method of claim 1, further comprising receiving the assistance data using the application layer protocol.

3. The method of claim 1, further comprising sending, to the server using the application layer protocol, information indicating a reference signal strength to enable the server to establish a fingerprint database, wherein the fingerprint database comprises a mapping relationship between the reference signal strength and the location information of the terminal.

4. The method of claim 1, further comprising further calculating the time difference based on a formula, wherein the formula comprises the times.

5. The method of claim 1, further comprising:
   separately sending, to the serving base station and the neighboring cell base station, a request for obtaining the assistance data; and
   receiving, from the serving base station and the neighboring cell base station, the assistance data.

6. A method implemented by a server and comprising:
   receiving, from a terminal and using an application layer protocol, a first time difference of arrival that is based on times at which a first reference signal of a first serving base station and a second reference signal of a first neighboring cell base station arrive at the terminal;
   calculating first location information of the terminal based on the first time difference and a preconfigured location calculation algorithm;
   sending to a service capability exposure network element, a first assistance data request comprising identifiers of the first serving base station and the first neighboring cell base station;
   receiving, from the service capability exposure network element and in response to the first assistance data request, first assistance data; and
   sending, to the terminal and using the application layer protocol, the first assistance data to assist the terminal in identifying the first reference signal and the second reference signal.

7. The method of claim 6, wherein the first neighboring cell base station is a neighboring base station of the first serving base station corresponding to the terminal.

8. The method of claim 7, further comprising sending, to the terminal and using the application layer protocol, information that is about the first neighboring cell base station and that comprises a physical cell identifier (PCI).

9. The method of claim 8, wherein before sending the information about the first neighboring cell base station to the terminal, the method further comprises:
   receiving, from the terminal and using the application layer protocol, a registration request comprising information indicating positioning methods supported by the terminal;
   selecting a target positioning method from the positioning methods;
   sending, to the terminal and using the application layer protocol, information indicating the target positioning method; and
   receiving, from the terminal, using the application layer protocol, and in response to the information indicating the target positioning method, cell information.

10. The method of claim 9, further comprising:
    sending, to a reference terminal and using the application layer protocol, information about a second neighboring cell base station, wherein the second neighboring cell base station is a neighboring base station of a second serving base station corresponding to the reference terminal, and wherein the second serving base station is the same as the first serving base station;
    receiving, from the reference terminal and using the application layer protocol, a second time difference of arrival that is based on times at which a third reference signal of the second serving base station and a fourth reference signal of the second neighboring cell base station arrive at the terminal;
    calculating second location information of the reference terminal based on the second time difference and the preconfigured location calculation algorithm;
    determining error location information based on reference location information of the reference terminal stored in a fingerprint database and the second location information of the reference terminal; and
    calculating first reference location information of the terminal based on the error location information and the first location information.

11. The method of claim 6, further comprising:
    obtaining second assistance data;
    sending, to a reference terminal and using the application layer protocol, the second assistance data, wherein a second serving base station corresponding to the reference terminal is the same as the first serving base station;
    receiving, from the reference terminal and using the application layer protocol, a second time difference of arrival that is based on times at which a third reference signal of the second serving base station and a fourth reference signal of a second neighboring cell base station arrive at the terminal, and wherein the second neighboring cell base station is a neighboring base station of the second serving base station;

calculating second location information of the reference terminal based on the second time difference and the preconfigured location calculation algorithm;

determining error location information based on reference location information of the reference terminal stored in a fingerprint database and the second location information of the reference terminal; and calculating first reference location information of the terminal based on the error location information and the first location information.

12. The method of claim 6, wherein the application layer protocol is an OMA Lightweight M2M (LwM2M) protocol, a oneM2M protocol, a Modbus protocol, or an OPC Unified Architecture (OPC UA) protocol.

13. A terminal comprising:
a memory configured to store instructions; and
a processor coupled to the memory and configured to execute the instructions to cause the terminal to:
send, to a server and using an application layer protocol, a registration request comprising information indicating positioning methods supported by the terminal;
receive, from the server and using the application layer protocol, information indicating a target positioning method selected from the positioning methods; and
send, to the server and according to the target positioning method, cell information;
receive, from a serving base station and a neighboring cell base station, assistance data;
identify, based on the assistance data, a first reference signal from the serving base station and a second reference signal from the neighboring cell base station;
calculate a time difference of arrival based on times at which the first reference signal and the second reference signal arrive at the terminal; and
send, to the server and using the application layer protocol to enable the server to calculate location information of the terminal.

14. The terminal of claim 13, wherein the processor is further configured to execute the instructions to cause the terminal to receive, using the application layer protocol, the assistance data from the server.

15. The terminal of claim 13, wherein the processor is further configured to execute the instructions to cause the terminal to send, to the server using the application layer protocol, information indicating a reference signal strength to enable the server to establish a fingerprint database, and wherein the fingerprint database comprises a mapping relationship between the reference signal strength and the location information of the terminal.

16. The terminal of claim 13, wherein the processor is further configured to execute the instructions to cause the terminal to further calculate the time difference based on a formula, wherein the formula comprises the times.

17. The terminal of claim 13, wherein the processor is further configured to execute the instructions to cause the terminal to separately send, to the serving base station and the neighboring cell base station, a request for obtaining the assistance data.

18. A server comprising:
a memory configured to store instructions; and
a processor coupled to the memory and configured to execute the instructions to cause the server to:
receive, from a terminal and using an application layer protocol, a first time difference of arrival that is based on times at which a first reference signal of a first serving base station and a second reference signal of a first neighboring cell base station arrive at the terminal;
calculate first location information of the terminal based on the first time difference and a preconfigured location calculation algorithm;
send, to a service capability exposure network element, a first assistance data request comprising identifiers of the first serving base station and the first neighboring cell base station;
receive, from the service capability exposure network element and in response to the first assistance data request, first assistance data; and
send, to the terminal and using the application layer protocol, the first assistance data to assist the terminal in identifying the first reference signal and the second reference signal.

19. The server of claim 18, wherein the first neighboring cell base station is a neighboring base station of the first serving base station corresponding to the terminal.

20. The server of claim 19, wherein the processor is further configured to execute the instructions to cause the server to send, to the terminal and using the application layer protocol, information that is about the first neighboring cell base station and that comprises a physical cell identifier (PCI).

21. The server of claim 20, wherein the processor is further configured to execute the instructions to cause the server to:
receive, from the terminal and using the application layer protocol, a registration request comprising information indicating positioning methods supported by the terminal;
select a target positioning method from the positioning methods supported by the terminal;
send, to the terminal and using the application layer protocol, information indicating the target positioning method; and
receive, from the terminal, using the application layer protocol, and in response to the information indicating the target positioning method, cell information.

22. The server of claim 21, wherein the processor is further configured to execute the instructions to cause the server to:
send, to a reference terminal and using the application layer protocol, information about a second neighboring cell base station, wherein the second neighboring cell base station is a neighboring base station of a second serving base station corresponding to the reference terminal, and wherein the second serving base station is the same as the first serving base station;
receive, from the terminal and using the application layer protocol, a second time difference of arrival that is based on times at which a third reference signal of the second serving base station and a fourth reference signal of the second neighboring cell base station arrive at the terminal;
calculate second location information of the reference terminal based on the second time difference and the preconfigured location calculation algorithm;
determine error location information based on reference location information of the reference terminal stored in a fingerprint database and the second location information of the reference terminal; and calculate first reference location information of the terminal based on the error location information and the first location information.

23. The server of claim 18, wherein the processor is further configured to execute the instructions to cause the server to:

obtain second assistance data;

send, to a reference terminal and using the application layer protocol, the second assistance data, wherein a second serving base station corresponding to the reference terminal is the same as the first serving base station;

receive, from the reference terminal and using the application layer protocol, a second time difference of arrival that is based on times at which a third reference signal of the second serving base station and a fourth reference signal of a second neighboring cell base station arrive at the terminal, and wherein the second neighboring cell base station is a neighboring base station of the second serving base station;

calculate second location information of the reference terminal based on the second time difference and the preconfigured location calculation algorithm;

determine error location information based on reference location information of the reference terminal stored in a fingerprint database and the second location information of the reference terminal; and calculate first reference location information of the terminal based on the error location information and the first location information.

24. The server of claim 18, wherein the application layer protocol is an OMA Lightweight M2M (LwM2M) protocol, a oneM2M protocol, a Modbus protocol, or an OPC Unified Architecture (OPC UA) protocol.

* * * * *

UNITED STATES PATENT AND TRADEMARK OFFICE
CERTIFICATE OF CORRECTION

PATENT NO. : 11,523,252 B2  
APPLICATION NO. : 16/988858  
DATED : December 6, 2022  
INVENTOR(S) : Hongna Chang Page 1 of 1

It is certified that error appears in the above-identified patent and that said Letters Patent is hereby corrected as shown below:

On the Title Page

(73) Assignee: "Huawei Technologies Co., Ltd., Shenzhen (CN)" should read "Huawei Cloud Computing Technologies Co., Ltd., Guizhou (CN)"

Signed and Sealed this  
Third Day of January, 2023

Katherine Kelly Vidal  
*Director of the United States Patent and Trademark Office*